United States Patent
Alt et al.

(10) Patent No.: US 9,757,862 B2
(45) Date of Patent: Sep. 12, 2017

(54) TACTILE SENSOR

(71) Applicant: Technische Universität München, Munich (DE)

(72) Inventors: Nicolas Alt, Munich (DE); Eckehard Steinbach, Olching (DE)

(73) Assignee: Technische Universität München, Munich (DE)

( * ) Notice: Subject to any disclaimer, the term of this patent is extended or adjusted under 35 U.S.C. 154(b) by 140 days.

(21) Appl. No.: 14/884,659

(22) Filed: Oct. 15, 2015

(65) Prior Publication Data

US 2016/0107316 A1    Apr. 21, 2016

Related U.S. Application Data

(60) Provisional application No. 62/064,502, filed on Oct. 16, 2014.

(51) Int. Cl.
*G06K 9/00* (2006.01)
*B25J 9/16* (2006.01)
(Continued)

(52) U.S. Cl.
CPC ........... *B25J 9/1697* (2013.01); *B25J 9/1612* (2013.01); *B25J 13/025* (2013.01); *B25J 13/081* (2013.01); *B25J 19/023* (2013.01); *G01L 1/25* (2013.01); *G01L 5/226* (2013.01); *G05B 2219/39532* (2013.01); *G05B 2219/40575* (2013.01); *Y10S 902/01* (2013.01); *Y10S 902/09* (2013.01)

(58) Field of Classification Search
CPC ...... B25J 13/084; B25J 13/085; B25J 9/1633; B25J 9/1697

USPC .... 382/149, 152, 153, 170, 218, 278; 901/8, 901/9
See application file for complete search history.

(56) References Cited

U.S. PATENT DOCUMENTS 6,606,540 B1   8/2003   Gross
7,444,887 B2   11/2008  Yoshida et al.
(Continued)

FOREIGN PATENT DOCUMENTS

DE           19750671 C2     6/2002
DE        102010023727 A1    12/2011
(Continued)

OTHER PUBLICATIONS

A. Kimoto and Y. Matsue. A new multifunctional tactile sensor for detection of material hardness. IEEE Transactions on Instrumentation and Measurement, 60(4)1334-1339, 2011.
(Continued)

*Primary Examiner* — Yosef Kassa
(74) *Attorney, Agent, or Firm* — Smartpat PLC

(57) ABSTRACT

A visuo-haptic sensor is presented which uses a deformable, passive material that is mounted in view of a camera. When objects interact with the sensor the deformable material is compressed, causing a change in the shape thereof. The change of shape is detected and evaluated by an image processor that is operatively connected to the camera. The camera may also observe the vicinity of the manipulator to measure ego-motion and motion of close-by objects. The visuo-haptic sensor may be attached to a mobile platform, a robotic manipulator or to any other machine which needs to acquire haptic information about the environment.

20 Claims, 19 Drawing Sheets

(51) Int. Cl.
    *B25J 13/02*     (2006.01)
    *B25J 13/08*     (2006.01)
    *B25J 19/02*     (2006.01)
    *G01L 5/22*     (2006.01)
    *G01L 1/25*     (2006.01)

(56) References Cited

U.S. PATENT DOCUMENTS

| | | | |
|---|---|---|---|
| 7,707,001 | B2 | 4/2010 | Obinata et al. |
| 7,878,075 | B2 * | 2/2011 | Johansson ............... B25J 13/084 73/862.046 |
| 8,191,947 | B2 * | 6/2012 | Jouan De Kervanoael ............ B25J 13/082 294/106 |
| 8,411,140 | B2 * | 4/2013 | Adelson ............... A61B 5/1172 348/135 |
| 8,421,311 | B2 * | 4/2013 | Chuang .................... G01L 1/16 310/328 |
| 8,671,780 | B2 * | 3/2014 | Kwom .................... G01L 5/161 156/196 |

FOREIGN PATENT DOCUMENTS

| | | |
|---|---|---|
| DE | 102013017007 A1 | 4/2015 |
| WO | 2005029028 A1 | 3/2005 |

OTHER PUBLICATIONS

D. G. Lowe. Distinctive image features from scale-invariant keypoints. International Journal of Computer Vision, 60 (2):91-110, 2004.

D. Göger, N. Gorges, and H. Wörn. Tactile sensing for an anthropomorphic robotic hand: Hardware and signal processing. In IEEE International Conference on Robotics and Automation (ICRA), Kobe, Japan, May 2009.

Dömötör Ákos, OptoForce White Paper, Jan. 2015.

H. Kato and M. Billinghurst. Marker tracking and hmd calibration for a video-based augmented reality aonferencing system. In IEEE and ACM International Workshop on Augmented Reality, San Francisco, CA, USA, 1999.

H. Yousef, M. Boukallel, and K. Althoefer. Tactile sensing for dexterous in-hand manipulation in robotics—a review. Sensors and Actuators A: Physical, 167(2):171-187, Jun. 2011.

J.-I. Yuji and K. Shida. A new multifunctional tactile sensing technique by selective data processing. IEEE Transactions on Instrumentation and Measurement, 49(5):1091-1094, 2000.

K. Khoshelham and S. O. Elberink. Accuracy and resolution of kinect depth data for indoor mapping applications. Sensors, 12(2)1437-1454, 2012.

P. Mittendorfer, E. Dean, and G. Cheng. 3d spatial self-organization of a modular artificial skin. In IEEE/RSJ International Conference on Intelligent Robots and Systems (IROS), Chicago, USA, Sep. 2014.

R. Bischoff, J. Kurth, G. Schreiber, R. Koeppe, A. Albu-Schaeffer, A. Beyer, O. Eiberger, S. Haddadin, A. Stemmer, G. Grunwald, and G. Hirzinger. The KUKA-DLR lightweight robot arm—a new reference platform for robotics research and manufacturing. In Robotics (ISR), International Symposium on and German Conference on Robotics (ROBOTIK), Munich, Germany, Jun. 2010. VDE.

S. Tsuji, A. Kimoto, and E. Takahashi. A multifunction tactile and proximity sensing method by optical and electrical simultaneous measurement. IEEE Transactions on Instrumentation and Measurement, 61(12):3312-3317, 2012.

E. Knoop and J. Rossiter, "Dual-mode compliant optical tactile sensor," in IEEE International Conference on Robotics and Automation (ICRA), Karlsruhe, Germany, May 2013.

E. Malts. Improving vision-based control using efficient second-order minimization techniques. In IEEE International Conference on Robotics and Automation (ICRA), New Orleans, LA, USA, Apr. 2004.

F. Mazzini, D. Kettler, J. Guerrero, and S. Dubowsky. Tactile robotic mapping of unknown surfaces, with application to oil wells. IEEE Transactions on Instrumentation and Measurement, 60(2):420-429, 2011.

Faragasso, A., Bimbo, J., Noh, Y., Jiang, A., Sareh, S., Liu, H., . . . & Althoefer, K. Novel uniaxial force sensor based on visual information for minimally invasive surgery. In IEEE International Conference on Robotics and Automation (ICRA), Hong Kong, China, May 2014.

J. Bong, M. Johnson-Roberson, M. Björkman, and D. Kragic. Strategies for multi-modal scene exploration. In IEEE/RSJ International Conference on Intelligent Robots and Systems (IROS), Taipei, Taiwan, Oct. 2010.

K. Kamiyama, K. Vlack, T. Mizota, H. Kajimoto, N. Kawakami, and S. Tachi, "Vision-based sensor for real-time measuring of surface traction fields," IEEE Computer Graphics and Applications, vol. 25, No. 1, pp. 68-75, 2005.

L. J. Gibson and M. F. Ashby, "Chapter 5—The mechanics of foams: basic results" In "Cellular Solids: Structure and Properties", Cambridge solid state science series. Cambridge University Press, Cambridge, 2nd edition, 1999.

M. Kaneko, N. Nanayama, and T. Tsuji, "Vision-based active sensor using a flexible beam," IEEE/ASME Transactions on Mechatronics, 6(1):7-16, Mar. 2001.

M. Kass, A. Witkin, and D. Terzopoulos, "Snakes: Active contour models," International Journal of Computer Vision, vol. 1, No. 4, pp. 321-331, Jan. 1988.

N. Alt, E. Steinbach, A Visuo-haptic Sensor for the Exploration of Deformable Objects,Int. Workshop on Autonomous Grasping and Manipulation: An Open Challenge,in conjunction with IEEE Int. Conf. on Robotics and Automation, Hong Kong, Mai 2014.

N. Alt, E. Steinbach, Navigation and Manipulation Planning using a Visuo-hapticSensor on a Mobile Platform, IEEE Trans. on Instrumentation and Measurement,vol. 63, No. 11, 2014.

N. Alt, E. Steinbach, Visuo-haptic sensor for force measurement and contactshape estimation, Proc. of IEEE Int. Symposium on Haptic Audio-VisualEnvironments and Games (HAVE), Istanbul, Turkey, Oct. 26-27, 2013.

N. Alt, J. Xu, and E. Steinbach, Grasp planning for thin-walled deformable objects. In Robotic Hands, Grasping, and Manipulation (ICRA Workshop), Seattle, WA, USA, May 2015.

N. Alt, Q. Rao, E. Steinbach, Haptic Exploration for Navigation Tasks using a Visuo-Haptic Sensor, Interactive Perception Workshop, ICRA 2013, Karlsruhe, Germany, Mai 2013.

S. Baker and I. Matthews. Lucas-kanade 20 years on: A unifying framework. International Journal of Computer Vision, 56(3):221-255, Feb. 2004.

S. Benhimane, A. Ladikos, V. Lepetit, and N. Navab. Linear and quadratic subsets for template-based tracking. In IEEE Conference on Computer Vision and Pattern Recognition (CVPR), Minneapolis, MN, USA, Jun. 2007.

S. Chitta, J. Sturm, M. Piccoli, and W. Burgard. Tactile sensing for mobile manipulation. IEEE Transactions on Robotics, 27(3):558-568, 2011.

T. F. Cootes, C. J. Taylor, D. H. Cooper, J. Graham, and others. Active shape models—their training and application. Computer Vision and Image Understanding, 61(1):38-59, 1995.

\* cited by examiner

TACTILE SENSOR

RELATED APPLICATIONS

This application claims priority to U.S. Provisional application Ser. No. 62/064,502, filed Oct. 16, 2014 which is hereby incorporated by reference thereto in its entirety.

TECHNICAL FIELD

The present application generally relates to a tactile sensor, and more particularly, to a camera-based visuo-haptic sensor.

BACKGROUND

Autonomous robotic systems typically use dedicated haptic or tactile sensors for interaction with objects. These sensors are required to determine exact contact points and forces when grasping or pushing an object. However, before an object is manipulated by a robot it is typically searched and tracked using a visual sensor, such as a camera or a laser scanner. Robots therefore often rely on two separate sets of sensors, based on the proximity of an object.

The use of two sensors based on different modalities causes a number of problems: A handover point between the sensor subsystems must be determined, ensuring coherency between haptic and visual perception. Incoherent measurements may lead to failures, such as incorrect grasps. Furthermore, system complexity and costs are higher due to the additional sensors. For example, haptic sensors require a lot of cabling if they cover larger surface areas of the robot. Finally, both the visual and haptic modalities have their specific shortcomings: Visual methods, for instance, often fail for transparent or specular objects, and cannot provide any information about weight or deformability of an object. Haptic sensors only provide sparse information about an object and require time-intensive exploration steps.

SUMMARY

The present application discloses a visuo-haptic sensor which acquires haptic and visual measurements simultaneously, providing naturally coherent data. The sensor utilizes compression of a passive, deformable element which is mounted onto a mounting structure such as an actuator, a robot, or another machine part. The deformable element is measured visually by a (low-cost) camera. The same camera may observe the nearby scene to detect objects and their reactions to manipulation. The disclosed sensor may be used on a wide range of applications, e.g. in applications where relative movement of two objects needs to be controlled such as on a mobile robotic platform, a robotic gripper, or other robotic tool.

The combined visuo-haptic sensing system may use one or more visual sensors, e.g. cameras, for remote sensing and environment mapping. The same visual sensors may be used to measure tactile data and haptic events in the proximity of the robot by attaching a deformable material to a robotic actuator. Deformation of the deformable material may be determined visually with high precision, and forces acting on the robot can be derived since the material characteristics are known. For low-end robots this approach may provide visual and haptic information from one integrated system, which reduces costs by removing the need for dedicated haptic sensors. More complex systems may benefit from more accurate models of the environment obtained by fusion of visual and haptic data.

The visuo-haptic sensor may be used to measure contact forces and object shape along a line or a curve. The mechanical part is preferably completely passive, and may in its simplest form consist of only a plastic foam rod. Forces applied to the foam result in a deformation thereof, which may be measured by a camera mounted above the foam rod. The sensor may take advantage of an existing camera and may be implemented by mounting an inexpensive piece of deformable material to a robot or an actuator. By detection of contours of the foam rod with visual snakes, its deformation may be measured in a dense fashion along its entire length. Several haptic properties may be acquired from the obstacles by pushing them. These properties, such as friction force, deformation, and the shape of the footprint, are referred to as haptic tags.

Furthermore, the same camera may track parts of the scene which are close to the manipulator using visual tracking. Specifically, approaching obstacles may be detected, allowing the platform to slow down before contact. During contact the motion against the floor, as well as the reaction of the object, may be determined using tracking.

An exemplary tactile sensor thus comprises a camera configured to capture images. An elastically deformable element having a front surface, a top surface, and a back surface is provided. The top surface of the deformable element is arranged within view of the camera and the back surface thereof is attached to a mounting structure, e.g. the body of a mobile robot, a robotic gripper, or any other device that interacts with objects where haptic information may be useful. An image processor is operatively connected to the camera. The image processor detects elastic deformation of the elastically deformable element in the captured images and determines a pressure and/or a force acting on the elastically deformable element based on the detected elastic deformation.

The contour of the top surface of the elastically deformable element changes between an uncompressed state, when no force is applied to the front surface, and a compressed state, when a force is applied to the front surface which compresses the deformable element between the front surface and the back surface. The image processor tracks the contour of the top surface of the elastically deformable element in the captured images and evaluates a relative displacement of the contour of the top surface between the compressed state and the uncompressed state. Preferably, the image processor converts relative displacement of the contour of the top surface from image coordinates to world coordinates, using intrinsic camera parameters in deriving world coordinates from image coordinates.

The tactile sensor may further comprise a data processor which determines forces and/or pressure acting on the deformable element and through it on the mounting structure based on a compression model of the deformable element and the relative displacement of the contours from the uncompressed state to the compressed state. The deformable element may be made of low-cost plastic foam or rubber foam.

Preferably, the camera has a field of view which is selected such that objects applying a force to the front surface of the elastically deformable element are at least partially visible in the captured images, so that the image processor can perform recognition and/or a pose estimation of the objects in the captured images.

The tactile sensor may be used on a finger of a robotic gripper and the gripper may be controlled in response to the pressure and/or the force determined by the tactile sensor. In another application the tactile sensor may be applied to a base or a body of a mobile robot and movement of the mobile robot may be controlled in response to the force and/or the pressure determined by the tactile sensor.

The camera may have a fixed or variable position relative to the back surface of the elastically deformable member. If the camera is rigidly connected to the mounting structure the image processor may use a constant geometric transformation in deriving world coordinates from image coordinates. The mounting structure may be rigid, so that the back surface of the elastically deformable member maintains a constant shape. The mounting structure may alternatively be elastic, in which case both the front surface and the back surface of the elastically deformable member may change their shapes when subjected to a force pushing onto the front surface of the deformable elastic member.

Where needed, the tactile sensor may utilize two or more elastically deformable elements that are in view of the camera and the image processor may determine the pressure and/or the force acting on each of the two or more elastically deformable elements separately. Also, the tactile sensor may use more than one camera to provide a good view onto the top surface of the one or more elastically deformable elements over a wide operating range and to prevent the top surfaces of the elastically deformable elements to become occluded by objects.

A method for controlling a robot may be based on providing an elastically deformable element on a rigid surface of a robot and providing a camera positioned such that a top surface of the elastically deformable element is in view of the camera. Images from the camera may be captured and evaluated to detect elastic deformation of the elastically deformable element. Based thereon a force acting on a front surface of the elastically deformable element may be calculated, and the calculated force may be used to control movement of the robot.

The method may for example be used to control the fingers of a two-finger gripper. In that case the rigid surface of the robot may be a finger of a two-finger gripper, and the elastically deformable element may be a cuboid piece of plastic foam having a back surface mounted to the finger of the two-finger gripper and an opposite front surface facing the opposite finger. Evaluating the captured images may then comprise detecting and tracking a contour of the top surface of the plastic foam in the captured images and determining a relative displacement of the contour compared to an uncompressed state in which no force acts on the finger. Evaluating the captured images may include converting the relative displacements from image coordinates to relative displacements in world coordinates based on intrinsic parameters of the camera and based on a geometric transformation between the camera and the back surface of the plastic foam.

Calculating the force acting on a front surface of the elastically deformable element may be based on a compression model of the plastic foam and on a distance between the front surface and the back surface of the plastic foam as determined by comparing a contour line associated with the front surface and a contour line associated with the back surface of the plastic foam.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
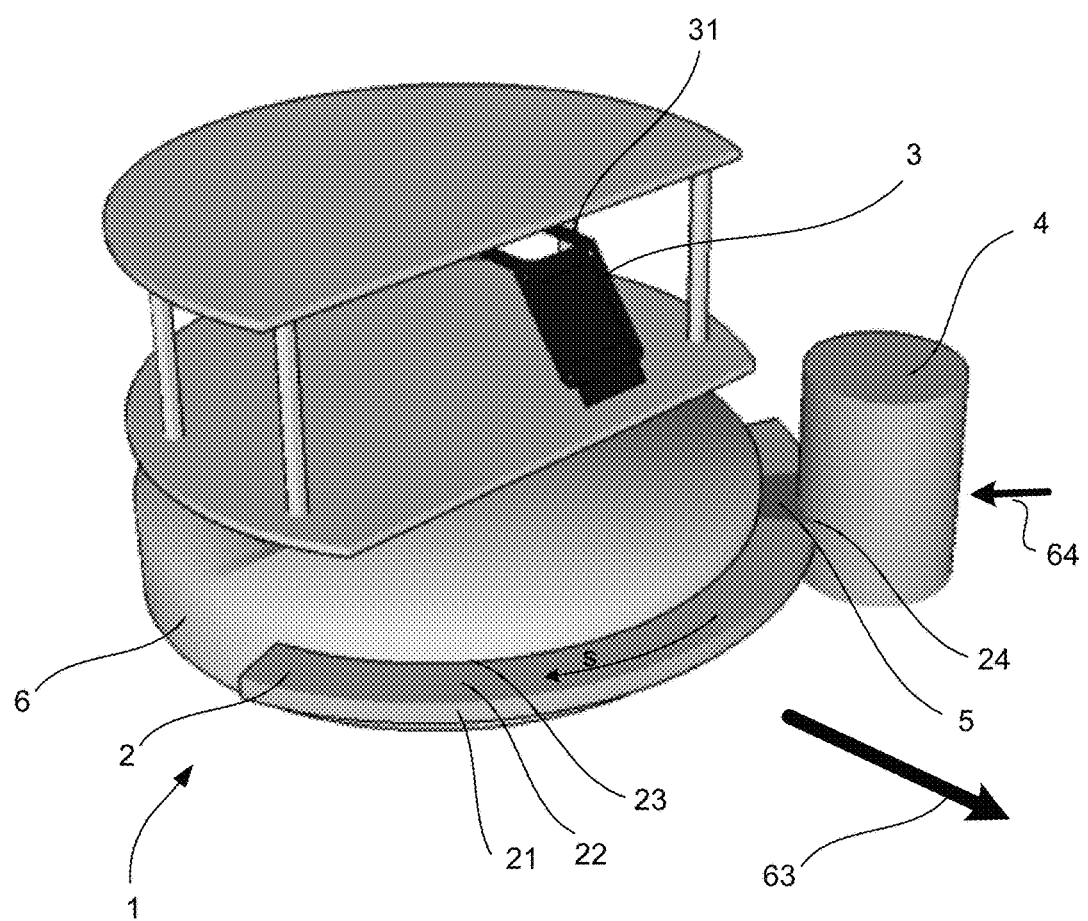
FIG. 1 shows an exemplary platform for haptic exploration using a visuo-haptic sensor with a piece of deformable plastic foam which is observed by a camera. An object is in contact with the foam and deforms it.
Figure 3:
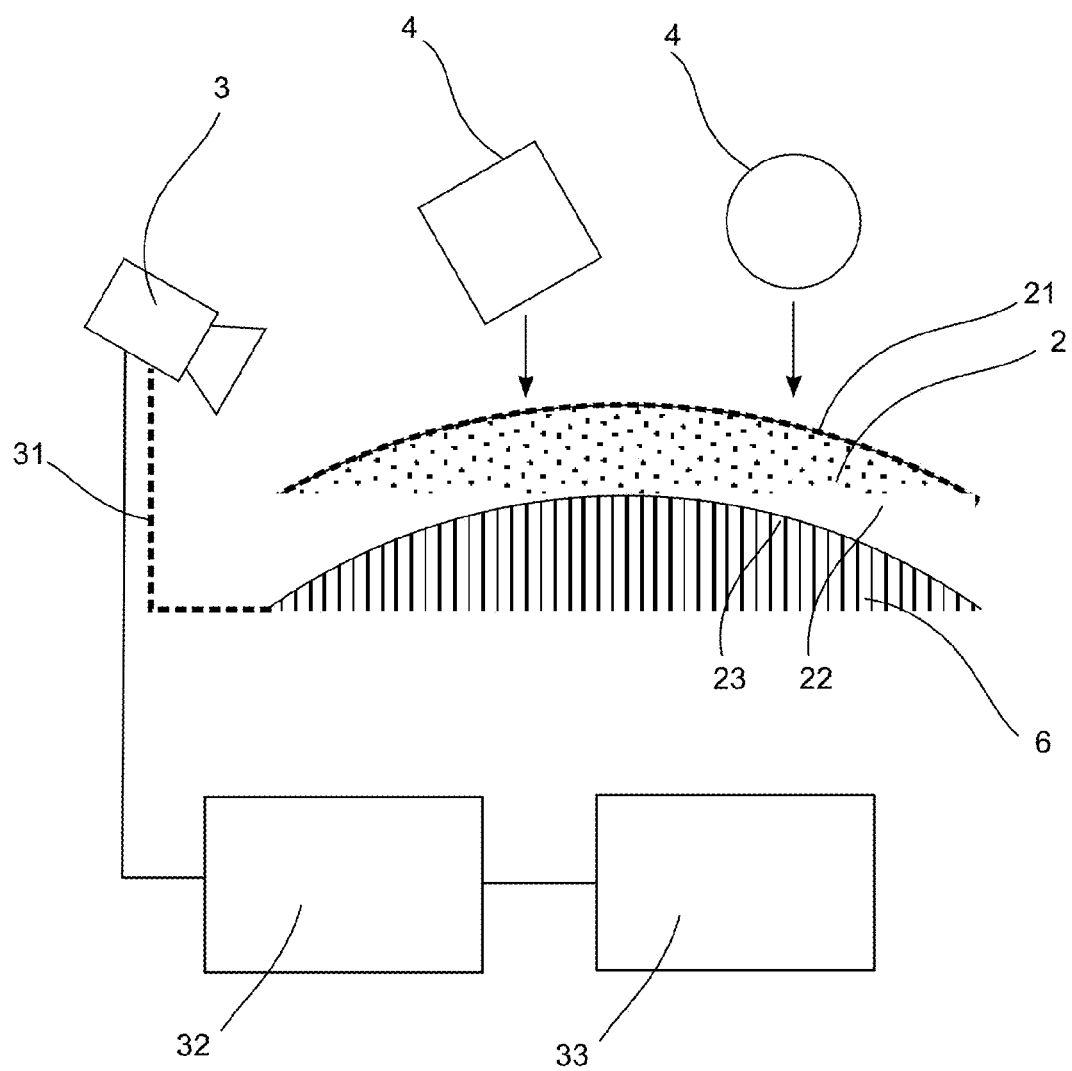
FIG. 3 is schematic illustration of a visuo-haptic sensing system in use on a mobile robot.

Referring to FIG. 1 and FIG. 3, an exemplary mobile robot 1 utilizes a tactile sensor to sense impact with external objects 4. The tactile sensor uses a camera 3 which captures images that are evaluated by an image processor 32. An elastically deformable element 2 is provided. The elastically deformable element 2 has a front surface 21, a top surface 22, and a back surface 23. The top surface 22 is arranged within view of the camera 3 and the back surface 23 is attached to a mounting structure 6, here being the base of the mobile robot 1.

The image processor is operatively connected to the camera 3 and configured to detect elastic deformation 5 of the elastically deformable element 2 in the captured images and to determine a pressure and/or a force acting on the elastically deformable element 2 in response to the detected elastic deformation 5.

A contour 24 of the top surface 22 of the elastically deformable element 2 changes between an uncompressed state when no force is applied to the front surface 21 and a compressed state when a force is applied to the front surface 21 which compresses the deformable element between the front surface 21 and the back surface 23. The compression and elastic deformation 5 of the elastic deformable area is shown in FIG. 1 in the darker shaded area where the object 4 pushes into the elastically deformable element 2.

The image processor 32 tracks the contour 24 of the top surface 22 of the elastically deformable element 2 in the captured images of the camera 3 and evaluates a relative displacement of the contour 24 of the top surface between the compressed state and the uncompressed state. The image processor 32 may convert relative displacement of the contour 24 of the top surface from image coordinates to world coordinates and may use intrinsic camera parameters in deriving world coordinates from image coordinates.

The tactile sensor may further comprise a data processor 33 which determines forces and/or pressure acting on the elastically deformable element 2 and through it on the mounting structure 6 based on a compression model of the deformable element 2 and the relative displacement of the contours from the uncompressed state to the compressed state. The data processor 33 may be an integrated electronic component with the image processor 32 or a separate component operatively connected to the image processor 32.

The elastically deformable element 2 may comprises plastic foam or rubber foam or may consist of plastic foam or rubber foam.

The camera 3 may have a field of view which is selected such that objects 4 applying a force to the front surface 21 of the elastically deformable element 2 are at least partially visible in the captured images, and the image processor 32 may perform object recognition and/or pose estimation of the objects 4 in the captured images.

Figure 2:
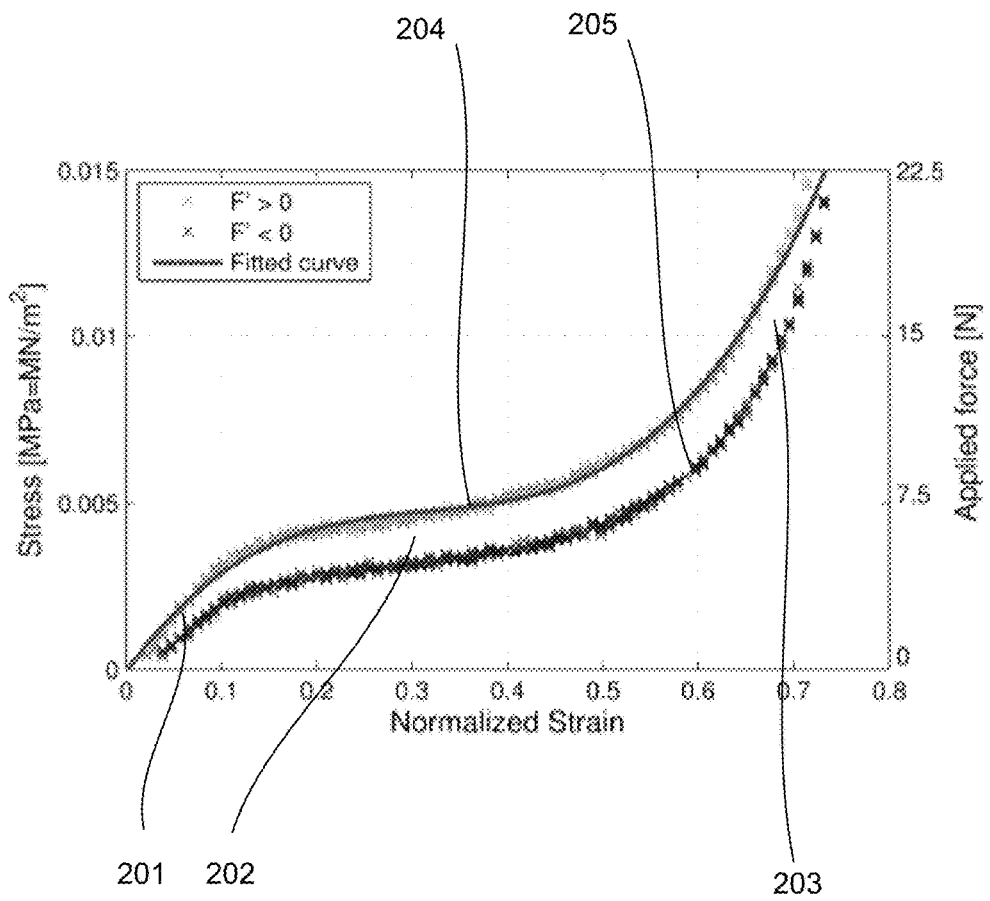
FIG. 2 shows experimentally determined strain-stress relation for a plastic foam. Data points were obtained while increasing (upper line) and decreasing (lower line) stress and curve fitted to a polynomial.

Mechanical properties of plastic foams that may be used to form the elastically deformable element 2 have been studied intensively. Referring now to FIG. 2, the strain-stress relation for these materials is typically non-linear, showing three regions: A region of linear elasticity 201 for very low strains, a plateau region 202 showing high sensitivity to stress, and a region of densification 203 when very high stress is applied.

Elastomeric materials such as the widely-used polyurethane (PUR) foams exhibit a monotonically increasing strain-stress relation. This allows the stress (or force) to be uniquely determined from the observed strain (normalized deformation). Manufacturers typically guarantee certain production tolerances and measure the deformation of their materials at several points, according to the standard ISO2439.

Referring back to FIG. 1 and FIG. 3, the elastically deformable element 2 may be a foam rod. Deformation of the foam rod 2 may be measured by determining the location of its contour 24 in the images captured by the camera 3. Approaches based on image edge features have been used for a long time for objects which are well-described by their contour. Snakes are one popular method of this type, which uses a model of several connected points moving in the image to minimize an energy term. This term consists of an image part attracting points to edge features, an internal part ensuring smoothness, and a part for external constraints, which limit the motion of the points and allows for initialization. The energy term is minimized by local search, allowing the tracking of edges as they move. If some edge points are very weak, the smoothness term ensures that the corresponding points are "dragged" by their neighbors. Initialization may be performed by a human or by another system which has some a priori knowledge of the estimated object position.

Figure 4A:
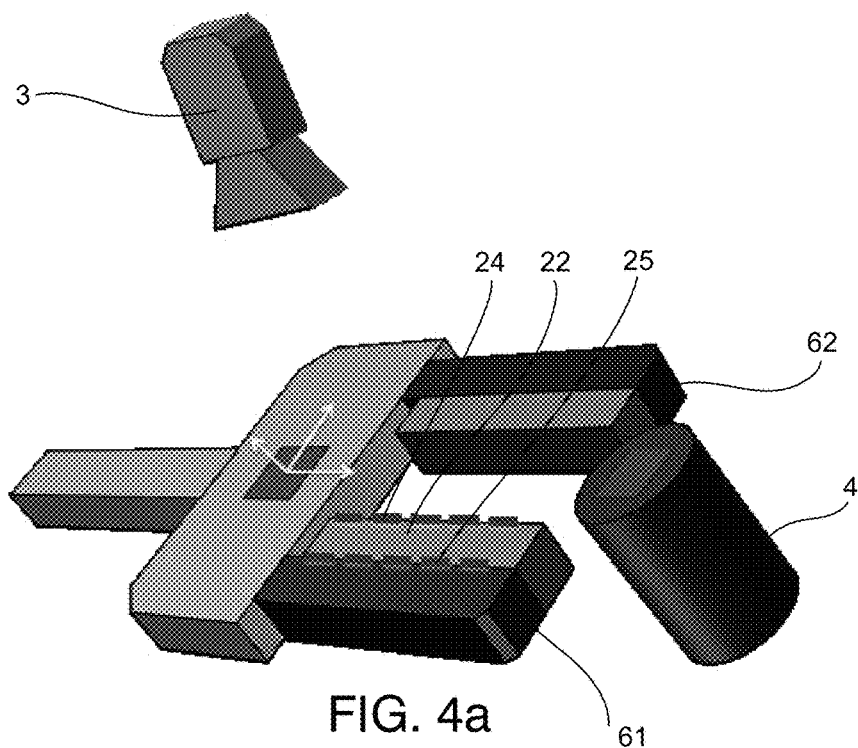
FIG. 4a shows an exemplary setup of a haptic sensor with passive deformable elements mounted on the fingers of a robotic gripper. A camera tracks the back and front contours of the deformable elements.
Figure 4B:
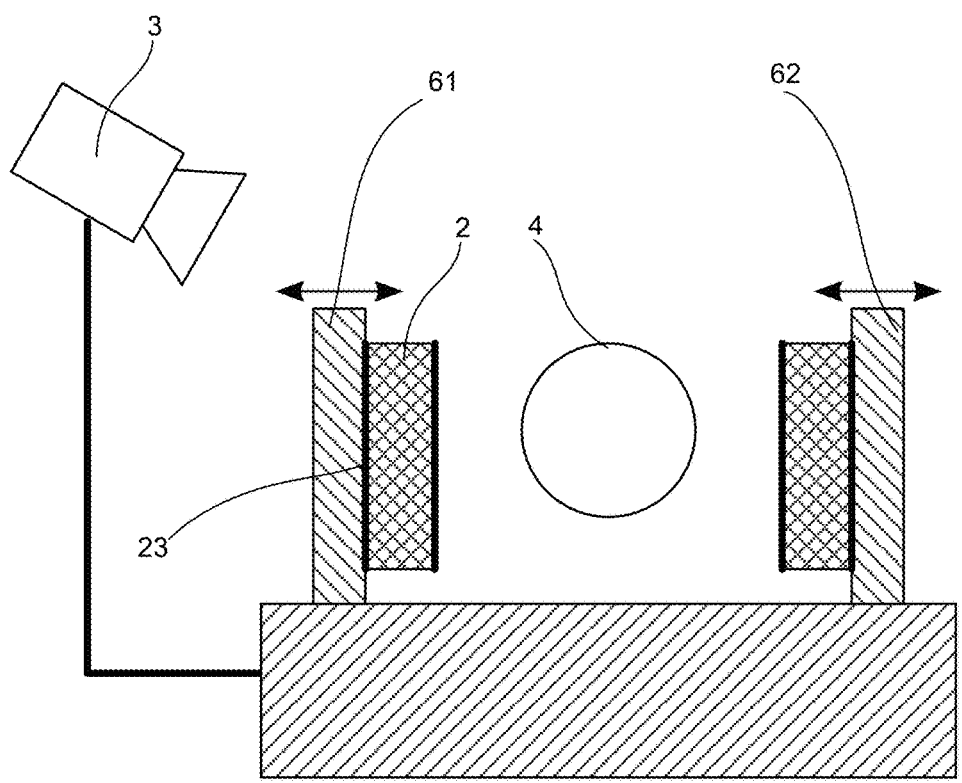
FIG. 4b is schematic illustration of a visuo-haptic sensing system in use on robotic fingers.
Figure 15:
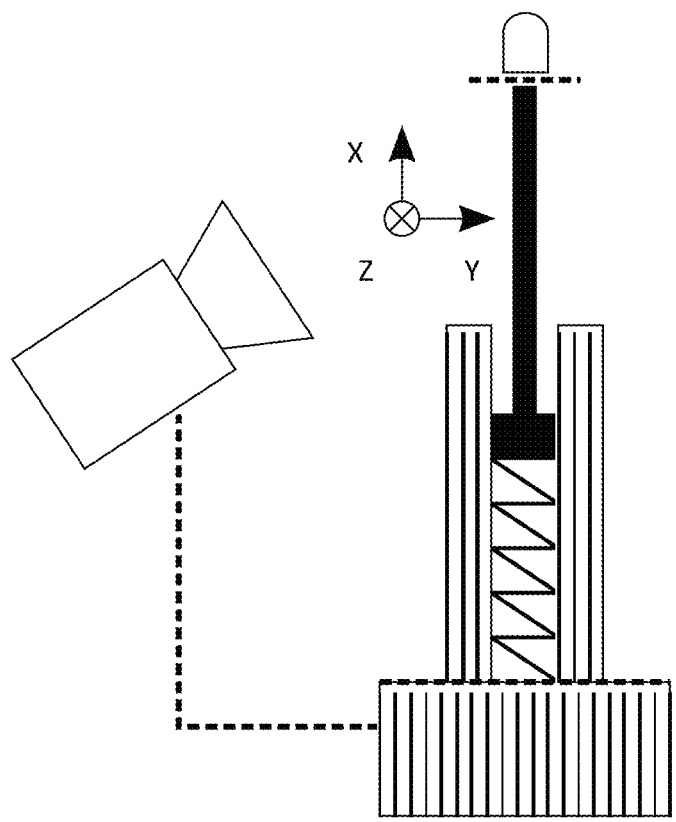
FIG. 15 is a schematic illustration of a visuo-haptic sensing system in use on an end-effector of a robot. The deformable element is formed by a spring and metal rod.

Different exemplary applications of a visuo-haptic force and tactile sensor system are schematically shown in FIGS. 3, 4b and 15. As shown, the tactile sensor system comprises one or more deformable elements 2 and one or more cameras 3 which observe the deformable elements 2. The deformation characteristics of the deformable elements 2 should be repeatable and non-destructive. Deformable elements 2 may comprise foams, cotton, cloth, air or liquid-filled structures, springs, beams or rods of metal, plastic, etc. The shape of the deformable element 2 is flexibly adapted to the machine and other needs of the application. A deformation model may describe the stiffness of the deformable element 2 and potentially additional deformation characteristics such as: Non-linearities in deformation behavior, hysteresis effects, relaxation or memory effects, time- or frequency-dependent behavior and the deformation shape of a local sensor impression (e.g. impulse response). The deformation model may be known a priori or obtained/refined during a training phase.

The camera 3 provides an image of the deformable element 2, as well as nearby objects 4 and nearby parts of the robot or machine 6 onto which the sensor is mounted. Measurements of the sensitive element are therefore naturally coherent with other visual measurements in the vicinity. An adequate tracking or detection algorithm determines the geometric deformation of the deformable element 2 from this image. Adequate trackers or detectors may be based on edges, feature points or descriptors, deformable or rigid templates, region detection based on color or other features, as well as model matching. The resting configuration at zero force (when the deformable element 2 is uncompressed) is determined during initialization and also serves as a model initialization.

Deformation, i.e. the geometric change of the front surface 21 of the deformable element 2 with respect to the resting position, is converted to world units (e.g. meters) using intrinsic parameters of the camera, as well as the pose between the camera and the deformable element 2 (extrinsic information). A local coordinate system may be extracted from the non-deforming back surface 23 for increased accuracy and tolerance to camera motion or motion of the robot itself. Deformation may be measured on one or many points in the image in one or more spatial dimensions. Using the deformation model, forces or pressure values are obtained from the geometric deformation. If these values are measured at several points or along lines, forces, pressure and impression are expressed over the location, e.g. along a line.

A complete 3D pose may be obtained from a 2D image either by a model of the deformable element 2 which includes real-world dimensions (e.g. a tracker template or 3D model), or by a known geometric relation between the camera 3 and the deformable element 2 and a deformation model which constrains the possible motion caused by deformation. Alternatively, if a depth or 3D camera is available, a full 3D pose is obtained directly.

Multiple cameras may provide several viewpoints of the deformable element 2. This allows to increase stability to occlusions and to improve accuracy by data fusion. For data fusion, measurements obtained from several cameras are fused based on a reliability term.

The deformable element 2 may be placed wherever forces, pressure or tactile data should be measured. A back surface 23 of the deformable element 2 may for instance be attached to a fixed or actuated part of a machine 6—such as a mobile or fixed robot base, a robot arm, the end-effector of a robot am, the fingers of a robot hand, the actuator of a production machine, etc. The opposite front side 21 of the deformable element 2 may come in contact for instance with objects 4, humans or obstacles in the environment and is usually not fixed permanently. The contact between the deformable element 2 and the object 4 is caused by movements or the robot 1, the object 4, or both. For example, an object 4 may be moved or pushed into the deformable element 2 by a drive or stimulus from motors, conveyor belts, environmental forces or humans. Also, a human or another active machine could touch the deformable element 2 directly. The machine 6 may also actively move towards the object, e.g. by motion of its mobile platform, of its arm or of its grippers/finger.

The front surface 21 may also be fixed to a tool, such as a manipulator, gripper, hand, or smaller tools such as screwdrivers, knives, etc. In that case, the tool comes in contact with the environment, and the goal is to measure forces applied to or applied by the tool. If forces between two machines or machine parts are measured, both sides of the deformable element are attached to machine parts.

The placement of the camera 3 is arbitrary as long as it observes the deformable element(s) 2 with the required accuracy. The camera 3 may be mounted onto the machine or the robot via a fixed mounting 31. In this case, the extrinsic relation between the camera 3 and the back surface 23 of the deformable element 2 may be static (rigid pose transformation). Alternatively, as illustrated in FIG. 4*b*, the camera may be mounted onto another part of the robot or machine, with joints or other actuators between the deformable element 2 and the camera 3. For instance, the camera may be mounted on the head of the robot, observing a tool on the arm. Also, the camera can be mounted to the gripper (often referred to as eye-in-hand), observing the moving fingers 61, 62. In that case, the extrinsic relation between the camera 3 and the back surface 23 of the deformable element 2 is dynamic. The pose may be determined either by (a) a structure which is detected visually and has a static connection to the back surface 23 or (b) by a geometric robot model, which calculates the pose based on the current positions of joints and actuators. Alternatively, the camera 3 may even be placed beyond the structure of the machine, e.g. onto a tripod in the room, or be mounted to the ceiling. In that case, the above-mentioned variants (a) or (b) may be used to obtain the extrinsic relation.

When mounted on a mobile robot the sensor may comprise a deformable material, such as plastic foam, which is attached to a robotic platform. The mobile robot may explore obstacles in the environment haptically, i.e. by driving towards and pushing into the obstactles. Contact points and forces may be determined by visually measuring the deformation of the foam, using the known deformation characteristics of the foam material.

In an exemplary embodiment a camera 3 is mounted about 20 cm above the deformable material 2, the optical axis of the camera 3 pointing down almost vertically. Images captured from camera 3 show the top surface 22 of the foam 2, the floor and scene in its direct vicinity, and a part of the platform 6. A consumer Full-HD USB camera with a diagonal field of view of ±40° is used. Those devices exhibit good image quality and are available at low cost due to the large proliferation of similar devices in smartphones. The focus is fixed by software and set to the foam 2; yet there is only a slight blur of the nearby scene.

Furthermore, the platform 6 may use a laser scanner (not shown), which scans a range of 240° in a plane parallel to the floor. Range data may be used for self-localization and building of 2D maps with a standard Visual SLAM system. Additionally, an inertial sensor (not shown) on the platform may serve as a motion prior for the SLAM system. The obtained maps and the laser scanner are not required for the acquisition of haptic tags—they are only used for navigation.

On the exemplary platform the deformable part 2 is a passive foam rod which is roughly 25 cm long (major axis) and has a cross section of w×h=2×1 cm. A standard PUR (polyurethane) foam is used which costs only a few cents and can be easily replaced in case of wear. The cross section is chosen based on the deformability of the material and the required force range. The rear surface 23 of the foam 2 is attached to a rigid mounting plate, which may be straight or curved. The opposing front surface 21 comes into contact with objects 4.

The direction of exploration, illustrated by arrow 63 in FIG. 1, corresponds to the dominant (forward) motion of the platform on the floor. Forces act along vectors d(s), illustrated by arrow 64, and deform the foam rod along its width w. Deformation is expressed as a scalar function δ(s) of displacement [in m], which is densely sampled along the major axis s. The normalized strain of the material is $$\frac{\delta(s)}{w}.$$

Sheer forces parallel to the mounting curve are negligible in this setup and are not measured.

Calibration may be performed by pushing a large plate onto the foam rod with a robot arm. The position is known with high accuracy from the robot arm controller, while the applied force (and thus the pressure) is measured with a JR3 force sensor. The process is repeated multiple times, yielding the data points shown in FIG. 2. There are some relaxation effects in the material—yet, they are negligible at the range of manipulation velocities used by our system.

The data points form a curve with three different regions 201, 202, 203. Since foam manufacturers provide material tolerances, calibration need only be performed once for a certain material type. Here, we mainly rely on the plateau region 202 for normalized strains in [0.1,0.5], which corresponds to a reasonable range of forces for the application at hand. Additionally, this region allows for the most accurate measurements, since the sensitivity of the material to force changes is largest. Note also that the curve exhibits a strong hysteresis effect, depending on whether forces are increased (upper curve 204) or decreased (lower curve 205). Therefore, we only measure the displacement while forces are increased. The characteristic curve is repeatable for multiple experiments.

Figure 6A:
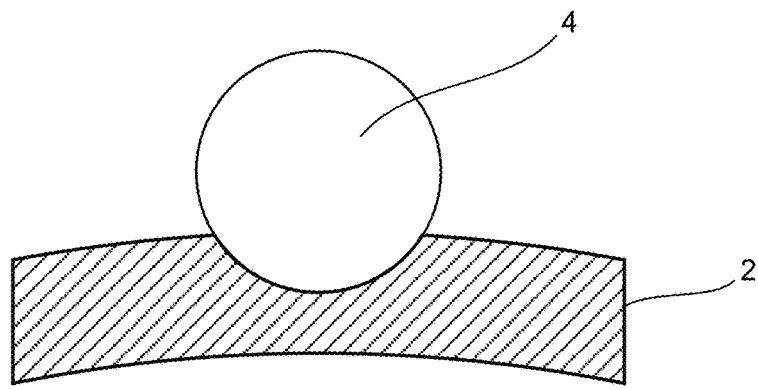
FIG. 6a illustrates the shape of an elastically deformable member while interacting with a cylindrical object.
Figure 6B:
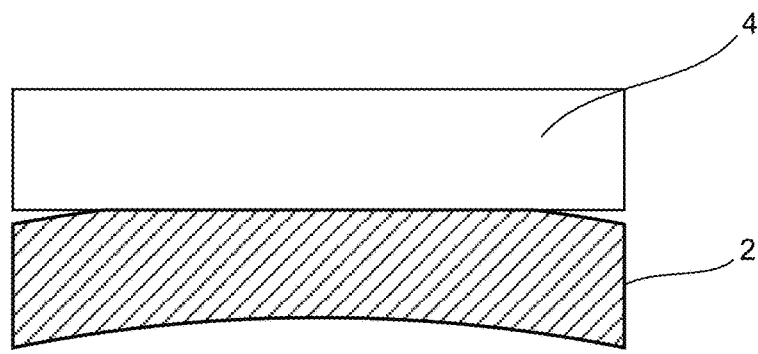
FIG. 6b illustrates the shape of an elastically deformable member while interacting with a wide rectangular object.
Figure 6C:
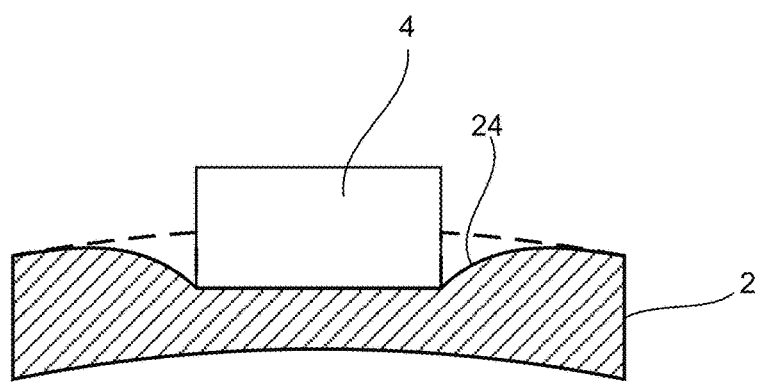
FIG. 6c illustrates the shape of an elastically deformable member while interacting with a narrow rectangular object.

There are several boundary effects to be considered: Local material deformability increases towards the edge of the foam. The foam deforms equally along its entire height when it pushes against an obstacle. Therefore, calibration is performed on the rod with the final cross-section. Thus, this effect is already taken into account for the edges along the major axis. However, stress discontinuities along the foam's front surface 21 (its major axis s) require special consideration: During measurement, if the stress applied to the foam is a step function along the front surface 21 (e.g. the edge of an object), the front contour 24 deforms smoothly beyond the contact area, as illustrated in FIG. 6c. The smoothing is attributed to internal tension in the foam and results in additional stress at the contact area. This additional stress is approximated by assuming that the smoothed contour is actually caused by an enlarged contact area. During calibration there are no such discontinuities, since the length of the rod is cut such that it fits under the plate.

A third-order polynomial f may be fitted to the points obtained from calibration, yielding a phenomenological model for the strain-stress relationship, which is depicted as curve 204 in FIG. 2. The curve 204 fits the data points well, except for the densification region 203, which corresponds to large forces and eventually the saturation of the sensor. The total contact force is obtained by integration over the stress (or pressure), using the calibrated model f, sensor width and height w, h, as well as the position along the major axis s:

$$F = h \int_{s=s_1}^{s_2} f\left(\frac{\delta(s)}{w}\right) ds \qquad (1)$$

Each object 4 causes one contact region, which is represented by the interval $[s_1, s_2]$, where δ(s)>0. If multiple objects are in contact with the foam, the individual forces are calculated by multiple integrals within respective intervals.

The outer contour 24 of the foam rod deforms when it comes into contact with an object 4, and the amount of deformation (in meters) may be determined using tracking of visual edges. Additionally, the inner edge 23 between the foam rod and the mounting structure 6 (e.g. the rigid surface of the robot) may be tracked to obtain a reference. The use of image edges is preferable for the application at hand since the foam 2 has no stable inner visual features. Contour detection based on image edges is stable regardless of lighting conditions, except for complete darkness. The edge strength varies considerably depending on the visual appearance of objects touching the sensor, which must be accounted for by the algorithm. In the rare case where brightness, color and shading values of the foam rod equal those of an object, the edge at the foam's contour would disappear. To prevent this case, it is possible to work with a foam material that changes its color along the major axis.

Figure 7A:
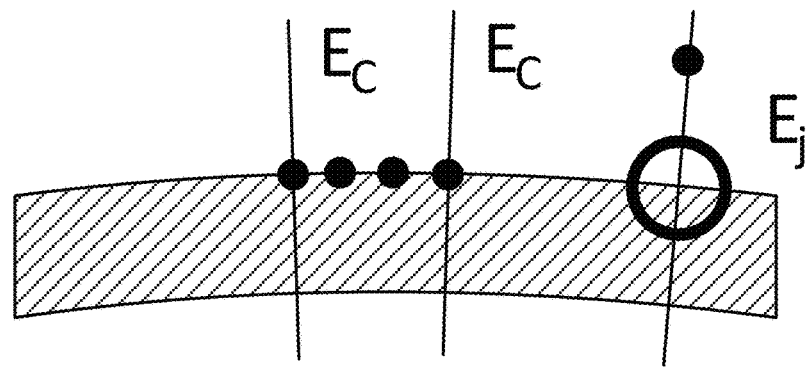
FIG. 7a shows schematically a top view onto an elastically deformable member. The energy term $E_c$ constrains the point motion and $E_j$ prevents jumping over the foam edge.
Figure 7B:
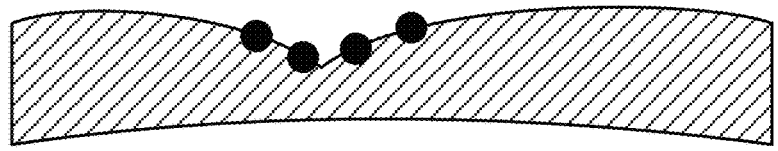
FIG. 7b shows schematically a top view onto an elastically deformable member. The snake points track the deformed foam and attach to the edge.
Figure 7C:
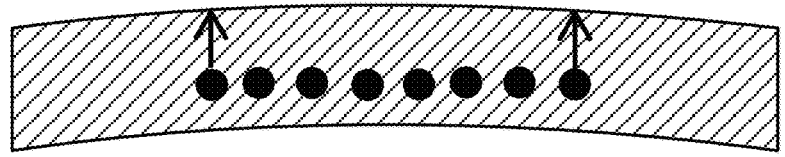
FIG. 7c shows schematically a top view onto an elastically deformable member. For robust initialization, points are pushed to the foam edge.

Edges are tracked using the well-known concept of snakes, which consist of connected points "snapping" to image edges. In an exemplary implementation we track points along the contour of the foam spaced about 3 mm apart, which allows for an accurate representation of possible deformations. After initialization, snake points move within a certain local neighborhood to iteratively minimize an energy term which consists of several parts. Reference is made to Eqn. (2) and FIG. 7a-c. First, the negative amount of edge strength $E_e$ tries to keep the points on image edges. In order to avoid snake points snapping to strong internal edges within an object, $E_e$ is limited to the average edge strength $\bar{e}$ of all snake points. A smoothness term $E_s$ accounts for the fact that the slope of δ(s) is limited. Furthermore, there are no edges within the foam rod, i.e. in between the inner and outer contour. Therefore, an energy term $E_j$ penalizes points jumping over edges along the path from the closest point of the reference snake $p_k^r$ to the current point. Finally, $E_c$ constrains point motion to the vector 64 of deformation 5, which is perpendicular to the reference contour of the foam rod. As this is the major direction of deformation, snake points stay on the same physical point on the foam, and the sampling density remains constant. The total energy is evaluated and minimized in a local neighborhood $\xi = [x,y]^T$:

$$E(\xi) = w \cdot [E_e, E_s, E_j, E_c], \qquad (2)$$

with $$E_e = -\min(|\nabla G * i|, \bar{e}),$$

$$E_s = (p_{k-1} - 2\xi + p_{k+1})^T (p_{k-1} - 2\xi + p_{k+1}),$$

$$E_j = \frac{1}{\bar{e}} \int_{x=p_k^r}^{\xi} |\nabla G * i| dx,$$

-continued $$E_c = \begin{cases} 0; & \text{if } (\xi - p_k^r) - \mathcal{P}^{-1}d(s) \\ \infty; & \text{otherwise} \end{cases}$$

Where i—image, ∇—gradient operator, G—Gaussian blur operator for noise reduction, $\mathcal{P}$—projection operator, see Eqn. (3). Weights w are set such that energy terms are in [−1,1] within the search space. A 1D constraint is imposed by $E_c$, so the search for the optimum is fast even for large neighborhoods. Processing at frame rate of 30 Hz poses no problem to a mid-range Intel i5 platform. Note that it may not be feasible to integrate shape priors in the energy term, as in more recent work using snakes. The contour of the foam is solely determined by the shape of the obstacles, and the correlation of close-by values of δ(s) is accounted for by $E_s$.

The approximate position of the foam rod in the camera image is typically known from a geometric robot model. Otherwise, it may be located using markers. First, the inner snake is initialized by adding points iteratively at a constant distance and having them snap to edge pixels. Points $p_k^r$ on the inner snake serve as a reference position of the sensor base—which might change slightly due to movement of the mounting plate or the camera. Next, points of the outer snake are initialized slightly outside of the inner snake. To allow for varying rod widths, these points are pushed away from the inner snake by an additional energy term until they reach the stable outer edge. The idle (uncompressed) state of the outer snake is used as the zero reference of displacement δ.

Pixel positions on the snake are converted to real-world coordinates using the intrinsic matrix of the camera 3 and a coordinate frame $(P_0,R)$ at the tip of the foam rod spanned by the exploration vector x and with y parallel to the floor. The mounting curve s and deformation vectors d lie on the x-y plane of this frame. In a robotic system $(P_0,R)$ are determined from the extrinsic camera parameters and the geometric robot model. Otherwise, the pose can be determined by applying markers. In this manner, it is sufficient to obtain 2D information from the camera. The projection operator $\mathcal{P}$ converts a point in the image $p=(x,y,1)^T$ [in pixel] via the camera-centered coordinate frame P(X,Y,Z) [in meters] to a point $P^F(X',Y',0)$ on the x-y plane of the reference frame with normal $n=R_{:,3}$:

$$P = \frac{P_0 \cdot n}{p' \cdot n} p', \; p' = K \cdot p \quad (3)$$
$$P^F = R(P - P_0), \mathcal{P}: p \to P^F$$

Visual measurements are noisy due to image noise, shaking of the camera and location uncertainty of the image edge. For individual snake points, noise with $\sigma_1=70$ μm is observed in the static case. Additionally, edge locations may be biased by large illumination changes or strong intensity discontinuities on objects close to the sensor. Bias effects depend on the surrounding scene and change with a much lower frequency than image noise. Taking into account these effects, at worst an edge uncertainty of $\sigma_2=0.5$ mm is observed.

Scene Motion

Figure 8:
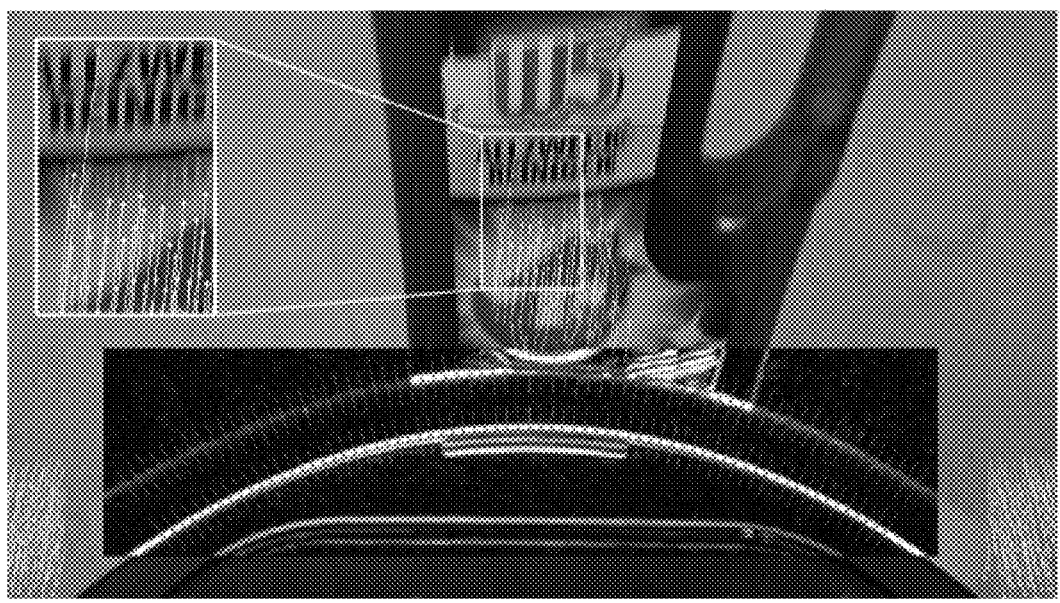
FIG. 8 shows an image captured by a camera of an exemplary visuo-haptic sensor. Visual point features are tracked on an object surface, as well as on the floor to measure motion in the respective image areas. Here, the object is just falling, and the track is lost due to motion blur.

Besides tracking the foam deformation, the camera 3 may observe the vicinity of the robot platform—specifically the floor, approaching obstacles and objects 4 in contact with the sensor. An exemplary camera image captured while the platform is approaching an object is shown in FIG. 8. While the platform is pushing an object, its ego-motion is determined by tracking the floor, complementing inertial sensors that may be present. Also, the surface of the object is tracked to determine its reaction. Specifically, rotations or unexpected sudden motion, such as falling over, are of relevance.

Approaching obstacles may be detected in order to allow the platform to slow down before touching them. Detection is again performed in the same captured camera image to obtain coherent data from the direct proximity of the sensor. Obstacles may be detected based on visual appearance differences or based on their height—since they are closer to the camera than the floor, they move faster. As feature tracking of the floor is problematic at higher speeds due to motion blur, we chose the former approach. An efficient way to model visual appearance is by using Gaussian mixture models, which are trained based on a set of expected images and detect contradiction to the trained model. Here, an approach is used, which handles the training process automatically and gradually adapts the model to the scene. The detector is trained automatically and quickly adapts to a change in the environment by learning the new floor model within a few frames. Obstacles are searched for only in the upper part of the camera image where they appear first.

During contact, tracking of the floor and the object surface above the foam may be performed using a Kanade-Lucas-Tomasi (KLT) tracker. This feature extractor finds corner-like structures in the image, which are well-localized and thus suitable for tracking. In order to ensure reliable motion estimates, only stable features are selected for tracking within the appropriate regions of the image. Features for floor tracking are selected within small patches left and right of the foam and a mask is created for the object based on the fitted primitive. Features are tracked over several frames and connected by local search, yielding a sparse motion field of the floor and the object. Exemplary feature tracks are depicted in FIG. 8.

Tracking works well on textured surfaces, but the quality depends on the appearance of the scene. Therefore, visual features are used to complement scene knowledge—if tracking fails, only the force measurements from the sensor are available. Typical failure cases are transparent or entirely textureless objects. Floor tracking is more reliable, since household floors are usually textured, and even plain concrete surfaces, as shown in FIG. 8, exhibit features from material wear or imperfections.

The motion model of the floor is a 2D translation and rotation of the platform on the (known) floor plane. Its parameters (speed, rotation) are estimated from the feature tracks to obtain a visual motion estimate, which complements the inertial unit of the platform. Some feature tracks will be incorrect (outliers) and must be removed. Motion parameters are estimated using RANSAC, which finds the majority vote of features and is thus robust to outliers and local failures. Projection of the motion onto the floor plane yields the real-world motion of the platform, coherent to the sensor readings. That way, fixed objects and deformable objects can be detected.

In FIG. 8 the object surface is located in the image area just above the foam. After foam deformation has reached its maximum, ideally the object, and thus the feature points on it, no longer move relative to the camera. Otherwise the object movement and especially its rotation are estimated using the motion of the features. Feature points are projected onto an estimate of the object surface. It is modeled as a plane which is perpendicular to the floor and spanned by a line which approximates the deformation region. Since the exact contact points are known and due to the small relative object motion, errors from model deviations remain low. Object motion is determined by homography estimation and decomposition of feature tracks. Rotation on the floor plane $H_R$ is most relevant.

Fall of an object usually occurs into the direction of the push and could be detected by fast rotation around the respective axis. However, tracking may not be able to follow such fast motion, and instead a sudden loss of track may be used to trigger a fall event.

A number of additional techniques could be applied to acquire visual scene knowledge. A depth camera would allow for stable extraction of the floor surface using plane fitting, and the object geometry could be accurately acquired. However, coherence needs to be ensured, and sensors like the Kinect exhibit a minimum range of 0.5 m. Furthermore, tracking could be performed with multiple image patches to increase stability and to obtain a homographic projection for each patch. The proposed system may not need additional techniques and may rely only on simple feature tracking, since this showed to be effective. This approach keeps the computational load low as compared to algorithms processing 3D point clouds.

Exemplary embodiments showing use of a visuo-haptic sensor in use with robotic grippers are shown in FIGS. 4a and 4b. The apparatus is mounted on a two-finger gripper 60 with a linear driver and equipped with strips of rubber foam 2 as the deformable element on the inside of the fingers 61,62. In general, the apparatus can be mounted on any robotic gripper or hand as long as the deformable elements are observable when needed by the camera(s) 3. The foam 2 is the passive deformable element of the sensor. When the gripper closes, it comes in contact with the object 4 and deforms depending on the local pressure. One or more cameras 3 are mounted above the gripper, such that they observe the top side of the fingers 61,62 and the top surface 22 of the foam material 2. To prevent occlusion of the foam 2 by the object 4, at least two cameras may be placed slightly outside of the grasping range. Alternatively, if the connection between camera and the gripper is movable, cameras and gripper may be oriented such that occlusion are avoided. This is typically possible if cameras are mounted on a robot head, and/or the gripper is mounted on a robotic arm.

Visual snakes may be used to track the two long contours on the top side of the foam—i.e. the reference contour $r_i$ 25 between the metallic finger and the foam, as well as the front contour $s_i$ 24 between the foam and object (or an artificial internal edge). Distances are converted from the 2D image to world coordinates [in meters] by the intrinsic camera parameters and by a projection onto the plane spanned by the finger's major axis and its motion axis. The absolute position of the finger is known from $r_i$, and the current deformation $\delta$ along the front contour s is calculated by $\delta_i = (s_i - r_i) - (s_i^{ref} - r_i^{ref})$. The reference configuration (uncompressed state of the foam 2) ref is obtained during initialization. Since the stiffness of the rubber foam is known, object deformation and the applied pressure can be obtained simultaneously.

The deformation characteristics of foam materials are well-investigated and generally expressed by a non-linear relation between normalized strain (compression) and stress (pressure [Pa]). We measure the strain-stress curve of the used rubber foam and approximate it by a third-order polynomial f, which yields the local pressure applied to the object. The curve obtained for rubber foam is more linear compared to plastic foams and has a slope of $$0.08 \frac{\text{MPa}}{1}$$

in its central region. The total force applied to the object is obtained by integration over the pressure using f, the normalized deformation $$\frac{\delta}{w}$$

along the front counter s and the material width/height w,h:

$$F = h \int_S f\left(\frac{\delta(s)}{w}\right) ds.$$

Visual snakes may be used for tracking objects which are well-defined by their contours. The foam material has no visible inner structure, such that edge tracking is the obvious choice. Snakes consist of connected points i which move in the image to minimize an image-based energy term, which primarily makes points snap to image edges. Furthermore, the energy term has a smoothness component, which drags points by their neighbors, if local edges are weak. If strong edges are present in the object, points may jump off the foam contour. This is prevented by a component which penalizes any edge between $r_i$ and $s_i$. The minimum of the energy term is searched iteratively in a local neighborhood along lines which are perpendicular to the contour in the reference configuration. This local 1D search makes points stay "in place" on the contour and ensures a low computational load for tracking.

Figures 5A, 5B:
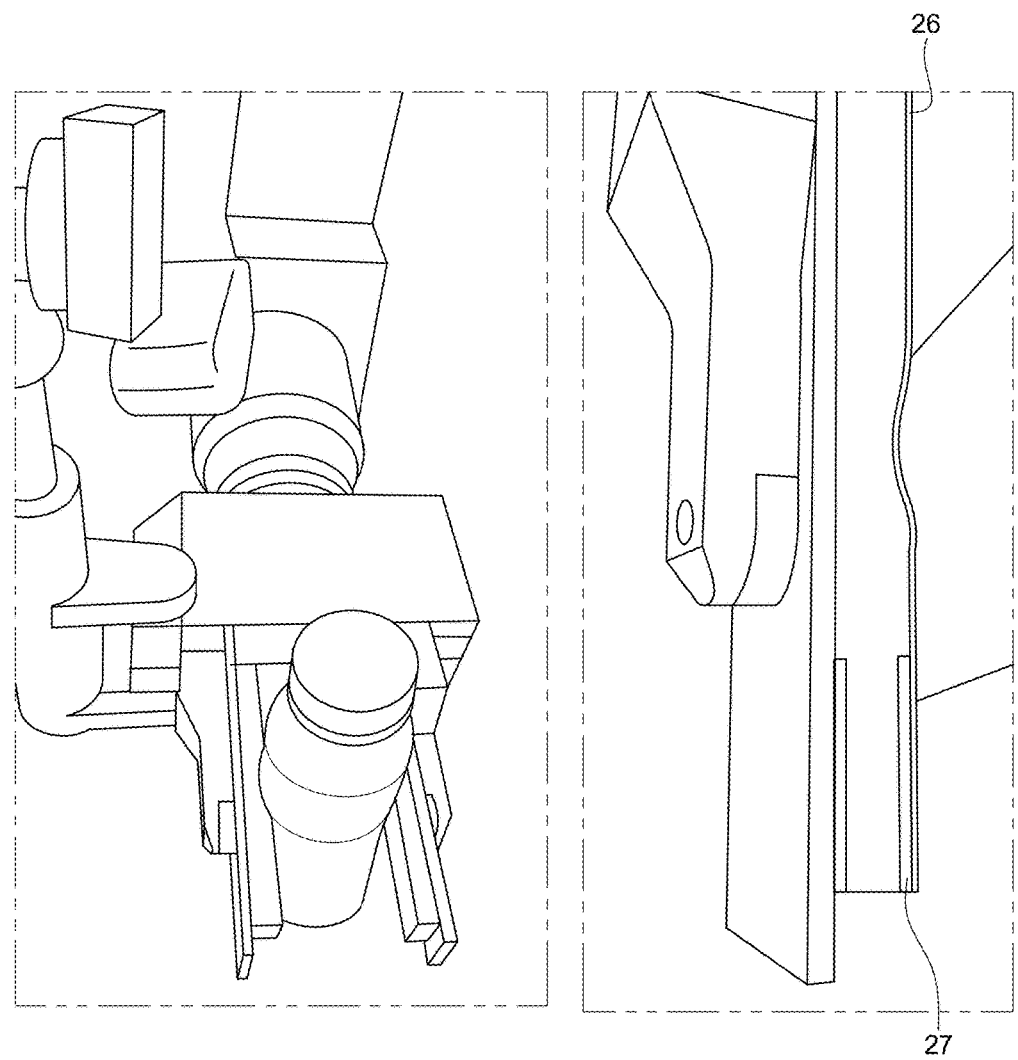
FIG. 5a is a photograph showing a test setup where an exemplary tactile sensor uses a low-cost webcam (top-left) and passive rubber foam strips on the fingers of a gripper (bottom).
FIG. 5b is an image of a foam strip mounted onto a robotic finger as viewed by a camera of a visuo-haptic sensor.

The front contour $s_i$ may be disturbed by strong edges in the object. Therefore, an internal contour is added to the top surface of the rubber foam by applying a narrow color stripe 26 in the front region as shown in FIG. 5b. The snake points $s_i$ now snap to the edge between the black foam and the green stripe 26. Since this edge is constant, the localization accuracy of points $s_i$ is improved. The effective width of the foam strip becomes smaller, and w must be adapted accordingly to account for the changed deformation behavior. Additionally, the color stripe 26 is used to detect occlusion of the foam by the object. Pixels which are directly in front of $s_i$ exhibit the appropriate (green) color, unless the foam is occluded. The corresponding points $s_i$ are invalid in this case. Pixel colors are classified using a Gaussian mixture model, which is trained to the observed color stripe 26 during initialization.

Initialization of snake points is performed on startup and whenever tracking is lost. For that purpose, the fingers are moved to a known reference position (e.g. by opening the gripper), and the reference snake points $r_i$ are initialized at a regular spacing of e.g. 2 mm between the two endpoints of the foam strip. The extrinsic relations between camera and foam strip are known from a geometric model up to a small error, or they are determined with a marker. By minimizing the energy term, snake points snap to the exact finger-foam edge. Next, the front snake $s_i$ 27 is initialized slightly in front of $r_i$ and then pushed away from $r_i$. Points $s_i$ will snap to the next edge, i.e. the front contour of the foam. This stable configuration is the zero-reference for deformation $\delta$, which thus also considers deviations in the foam shape.

Experiment 1

The disclosed sensor concept was evaluated with a commercial two-finger gripper mounted on a Kuka lightweight robot arm. A strip of rubber foam with a cross section of about 1×1 cm was attached to each finger, and a single camera was mounted above the gripper to track one of the fingers. The system relied solely on visual data, therefore the dedicated position and force sensors in the gripper were not used. Initialization was performed using a reference template on the gripper.

Figure 9A:
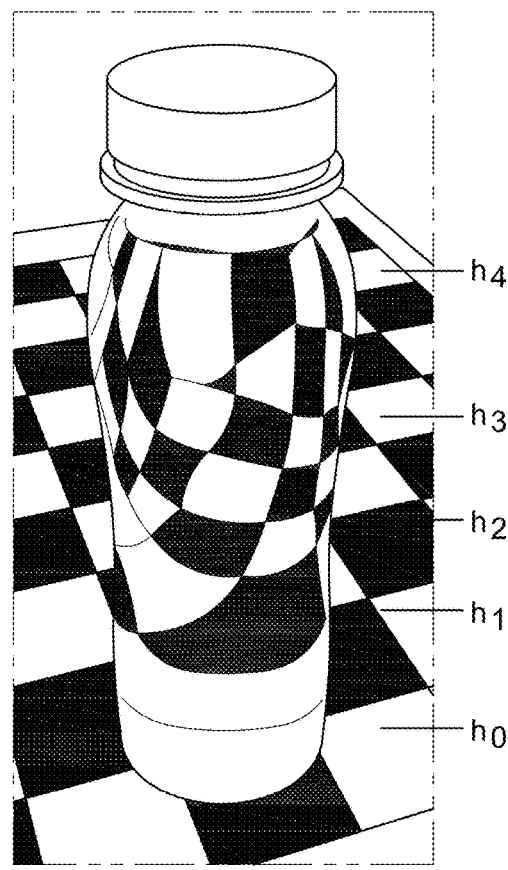
FIG. 9a is a photograph showing a transparent bottle in front of a checkerboard pattern.
Figure 9B:
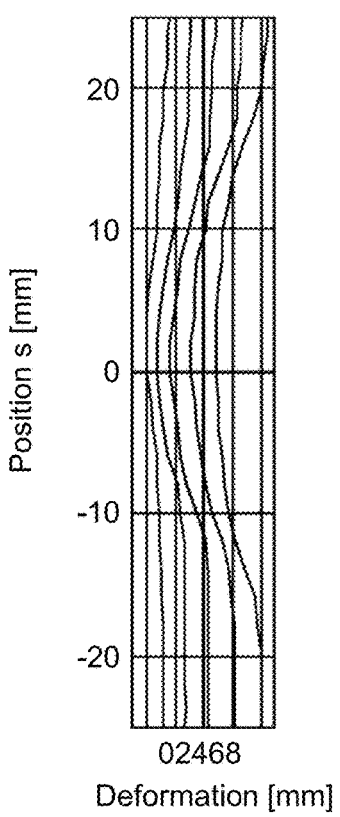
FIG. 9b is a graph showing deformation shapes measured at the center of the bottle as in FIG. 9a while increasing the pressure.
Figure 9C:
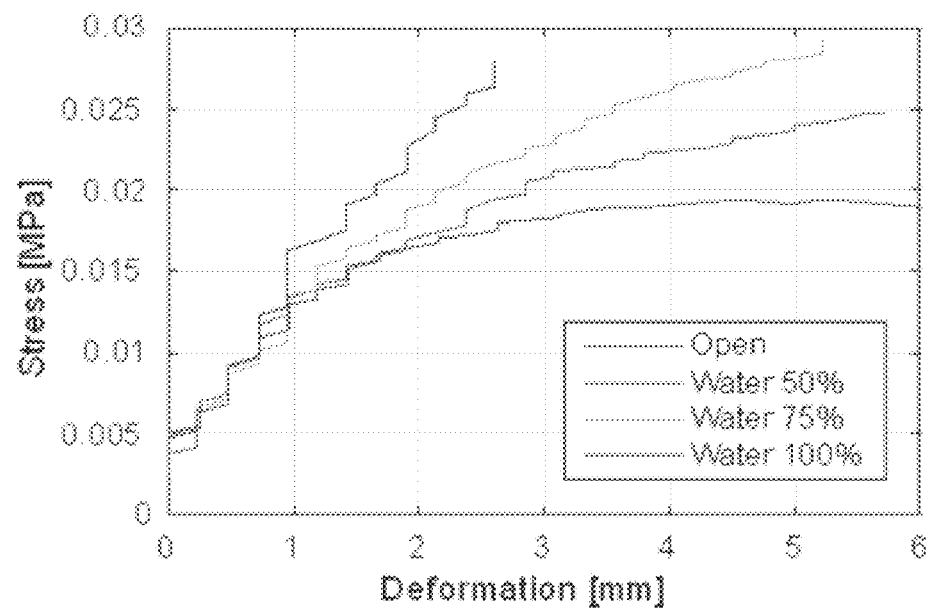
FIG. 9c is a graph plotting stiffness of the bottle as in FIG. 9a at height $h_2$ with open cap or closed cap and varying levels of water inside.

Referring now to FIG. 9a, in a first experiment the stiffness and shape of a typical household object, a plastic bottle, was measured. While the gripper is closed around the bottle at half height $h_2$, the deformation and applied pressure are recorded. FIG. 9b shows the deformed shape of the bottle at four different points in time. With increasing pressure (left to right), the entire surface retreats, the curvature decreases slightly and the contact area increases. The experiment is repeated with different levels of water inside the (closed) bottle. A closed bottle exhibits a tendency to preserve its volume—on compression, air applies an increasing counterpressure onto the inside surface. Most liquids prevent any volume change, such that compression must be compensated by an expansion in other areas. FIG. 9c shows the deformation-stress relations in the center of the contact region. They are equal for small deformations, since volume preservation is not dominant here. For large deformations, the bottle with 100% water is stiffest, since volume changes are prevented by the liquid.

Figure 9D:
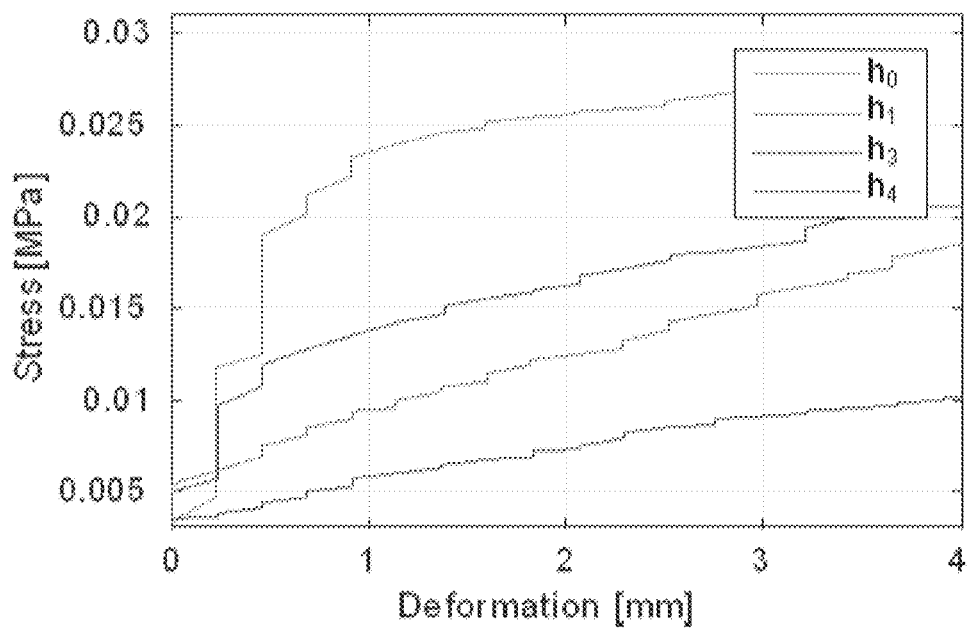
FIG. 9d is a graph plotting stiffness of the bottle as in FIG. 9a at various positions along the height of the bottle (measured with open cap).

Separately, stiffness was evaluated at different height levels of the bottle by moving the gripper with the robot arm (haptic exploration). Stiffness of a thin-walled object exhibits a high dependency on the local geometry. FIG. 9d shows that the object is very stiff at the bottom and at the top. These are both convex regions, which provide most support. However, it can also be seen that there is a knee in the curves for $h_{3,4}$: Here, the surface bends to the inside and the support from the convex geometry is suddenly lost. Stiffness is low and almost linear near the center.

Experiment 2

Figure 10:
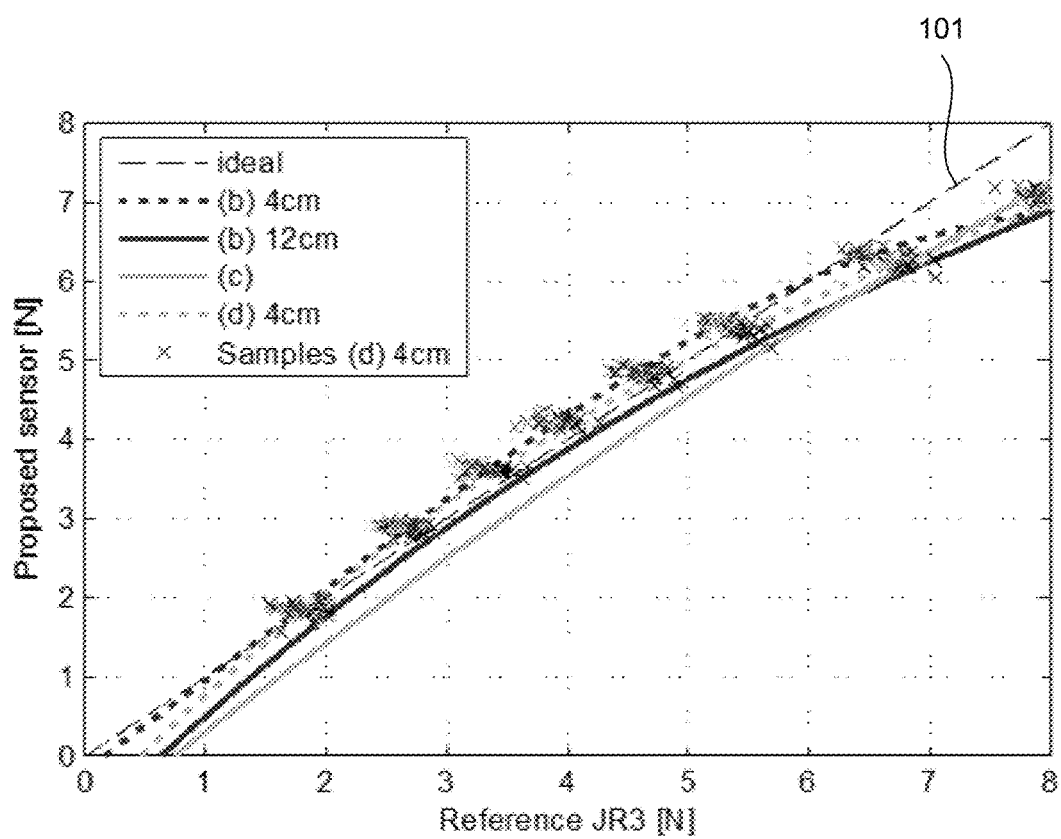
FIG. 10 is a graph comparing the measured force as measured with an exemplary tactile sensor against a reference obtained by a JR3 force sensor.

In order to determine the accuracy of the disclosed visuo-haptic sensor, objects were pushed into the foam with different forces using a KUKA lightweight robot arm. The applied force was measured using a commercial, factory-calibrated JR3 force sensor, which serves as the reference. At the same time forces obtained from the proposed sensor with Eqn. (1) were recorded and plotted against the reference force. The results are illustrated in FIG. 10. The experiment was repeated with different object shapes as depicted in FIG. 6a-c. Two cylinders with diameters 4 cm and 12 cm, a large plate as well as one with 4 cm width were used. Note that the pressure applied to the foam by the small plate has strong discontinuities at the edges and resembles a step function. The impression in the foam was smoothed out due to internal tension.

A polynomial of order three was fitted through the obtained data points, yielding the characteristic curves in FIG. 10. Ideally, the curves should follow the dashed line 101—yet a small systematic error is observed, which depends on the object shape: Small forces are underestimated, especially for large objects, which may be attributed to the high slope of the sensitivity curve in that region. Large forces are underestimated for all object shapes. This error could be further reduced by a more accurate foam deformation model. Note that the curve for the small plate (d) is close to the ideal line, despite the fact that the foam impression extends significantly beyond the edges of this object. Thus, the disclosed modeling of such boundary effects proves to be valid.

Individual data points for object (d) are depicted with an x-symbol in FIG. 10. Multiple data points represent four different experiments and show that the repeatability is within the value of the noise. The observed standard-deviation for the proposed sensor is $\sigma=0.075N$ along the entire range. This is lower than the value observed for the JR3 reference, $\sigma_{ref}=0.15N$. However, it must be noted that the JR3 sensor has a sampling rate of up to several kHz and might have been distorted by vibrations of the robot arm. Since the force Eqn. (1) is calculated from multiple points in the image, there is an inherent smoothing effect.

Experiment 3

A mobile platform equipped with the disclosed visuo-haptic sensor was driven towards several different obstacles in a room, such as boxes, bottles, tables, doors and walls. Contact with an obstacle was detected when the foam rod started to deform. The speed of the platform was reduced based on the visual proximity detector to avoid damage to the object. The movement was stopped completely if one of the following conditions became true: (a) the amount of deformation exceeded an upper limit, i.e. the strain goes to the densification region, (b) the total force, see Eqn. (1), reached the pushing capabilities of the robot, or (c) the robot moved for a distance larger than the width of the sensor. In the latter case, a movable object is observed, and the measured force corresponds to the friction force of the object. In the other two cases, the explored object is fixed—at least for the capabilities of the platform.

Figure 11A:
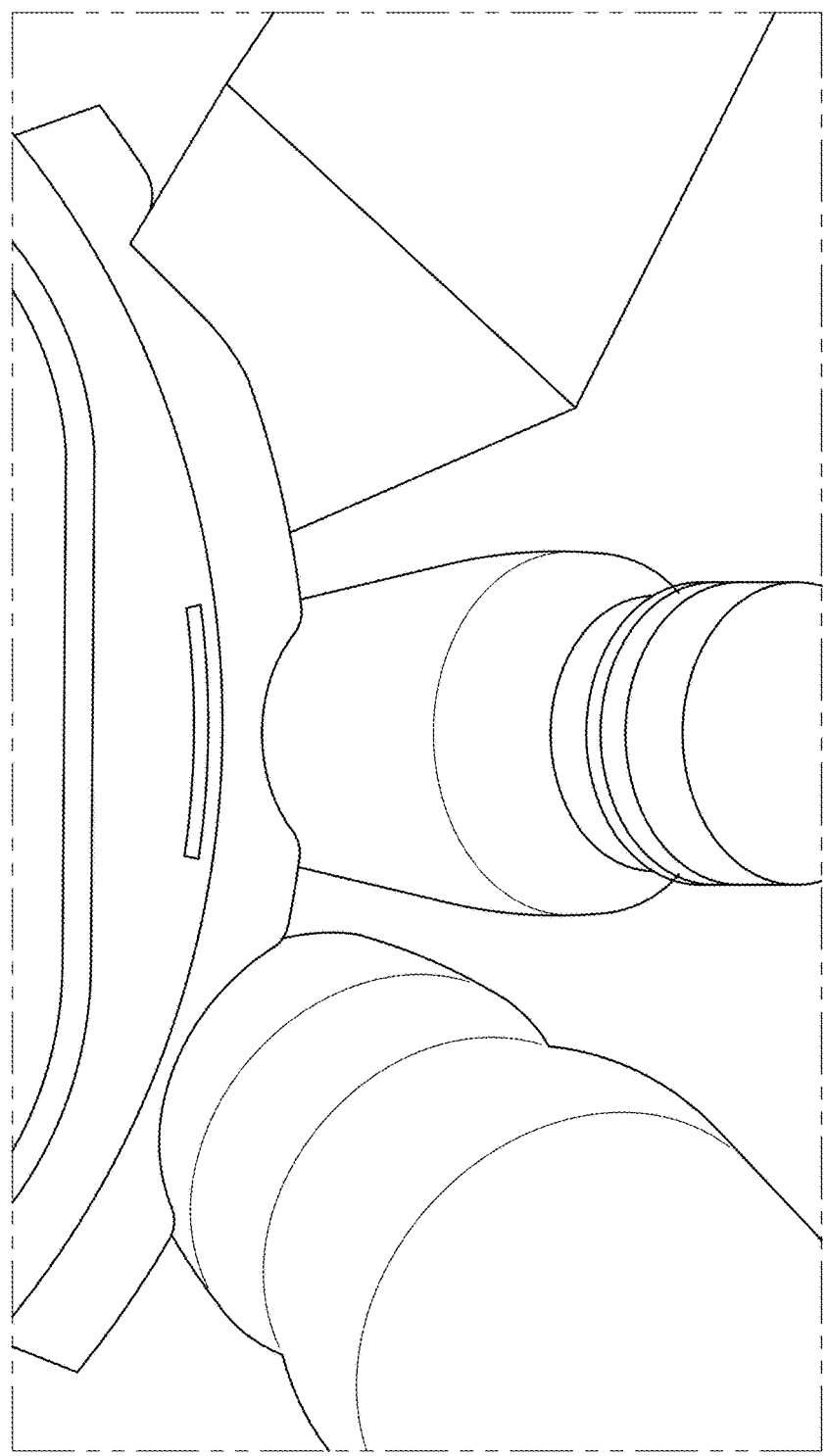
FIG. 11a is an image by a camera used in an exemplary tactile sensor while in contact with three different objects.
Figure 11B:
FIG. 11b is an image captured by a camera used in an exemplary tactile sensor while in contact with a large flat object. Additionally, the fitted geometric primitive is depicted.
Figure 11C:
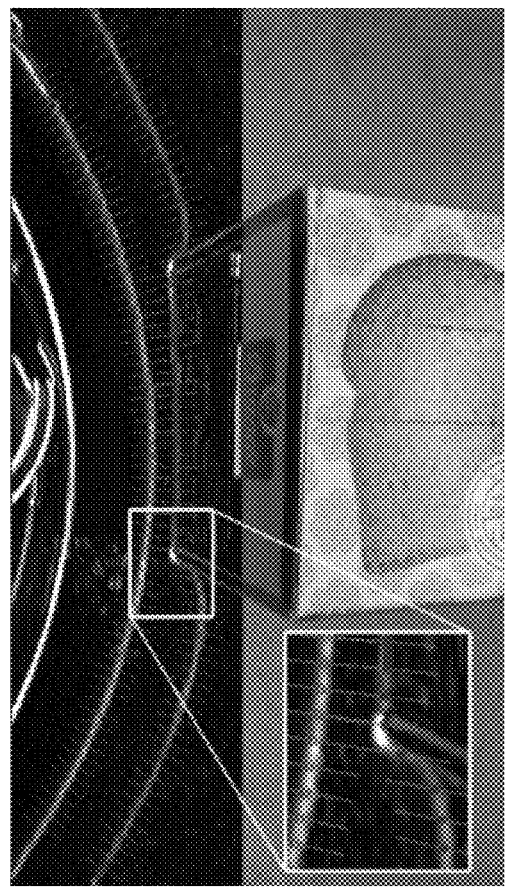
FIG. 11c is an image captured by a camera used in an exemplary tactile sensor while in contact with a narrow flat object. Additionally, the fitted geometric primitive is depicted.
Figure 11D:
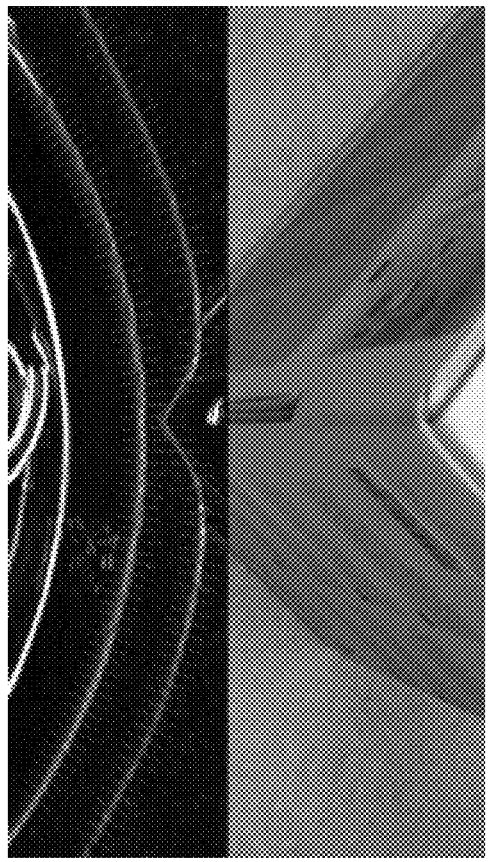
FIG. 11d is an image captured by a camera used in an exemplary tactile sensor while in contact with a corner object. Additionally, the fitted geometric primitive is depicted.
Figure 11E:
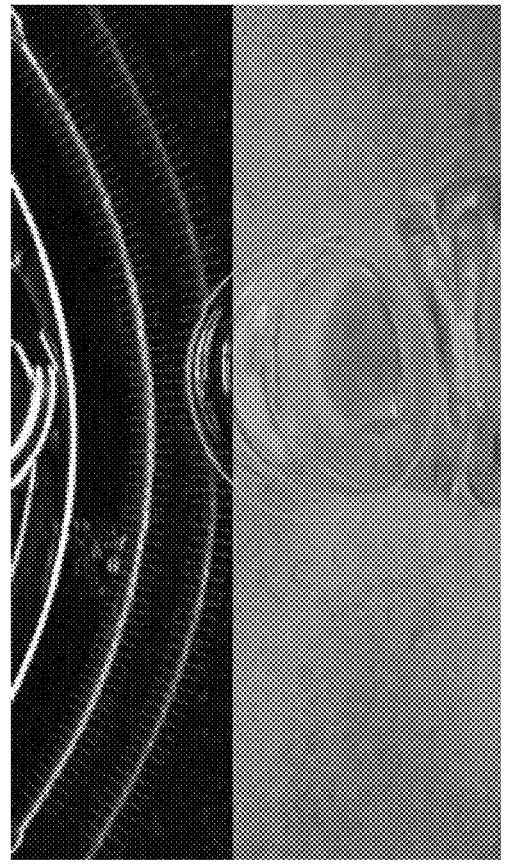
FIG. 11e is an image captured by a camera used in an exemplary tactile sensor while in contact with a small cylindrical object. Additionally, the fitted geometric primitive is depicted.
Figure 11F:
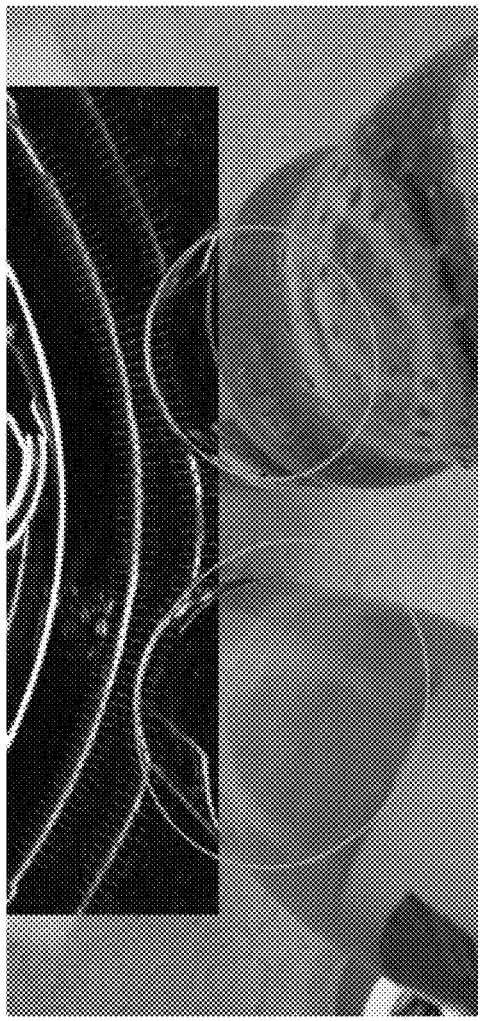
FIG. 11f is an image captured by a camera used in an exemplary tactile sensor while in contact with two transparent glass objects. Additionally, the fitted geometric primitives are depicted.
Figure 11G:
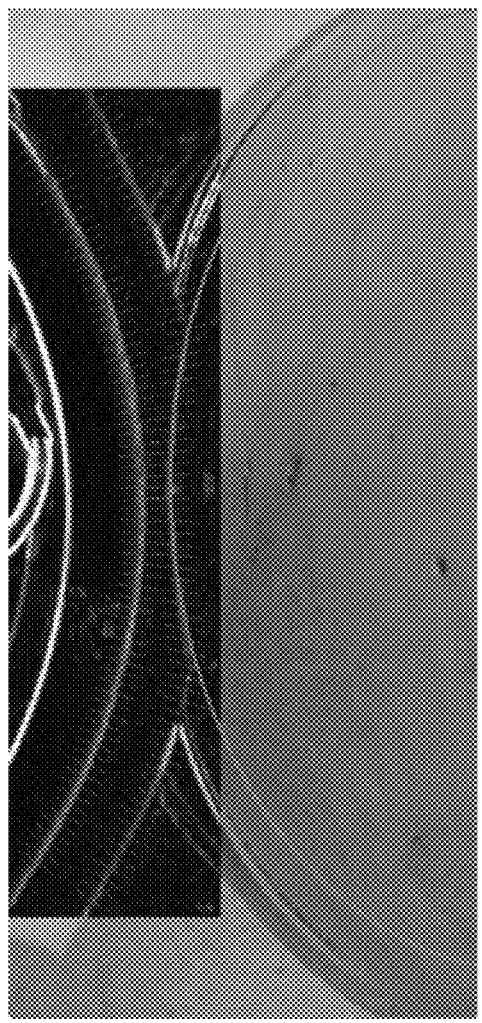
FIG. 11g is an image captured by a camera used in an exemplary tactile sensor while in contact with a large cylindrical object. Additionally, the fitted geometric primitive is depicted.

For both kinds of objects, fitting of geometric primitives was triggered during the halt of the platform. Measurements were most stable in the static case and allowed for the best possible fit. Examples of some explored objects are shown in FIG. 11a-g, together with the fitted geometric primitive. The correct primitives are fitted with high accuracy in images FIG. 11b-e and FIG. 11g. The bottles in FIG. 11e and FIG. 11f are (partially) transparent and could thus not be detected by purely visual methods. The fitted circle primitives have the correct size for FIG. 11e, but are slightly under- or overestimated for the two bottles in FIG. 11f. This may be attributed to an imperfect fit of the primitive at the boundaries of the deformation region.

Finally, the platform was moved back, and the haptic tag was generated. Table 1 shows results obtained for various objects. The following important object properties can be obtained from the tag: Fixed, i.e. the platform did not succeed to move a heavy object (PC); falling objects (cleaner) react in a sudden movement when pushed and can thus not be reliably manipulated; deformable materials retreat when pushed by the foam (here the cushion is fixed to apply a large force). The remaining objects are movable, but require significantly different efforts. Note how a larger weight of the same object (paper bin, vase) is detected by an increased friction force. The door exhibits a large drift, since it rotates around its hinge and it continues its motion after the platform stops. Finally, a large drift was observed during the first exploration of the vase: Its rectangular footprint was touched at a corner, such that the object rotated during the push.

TABLE 1

Figure 12:
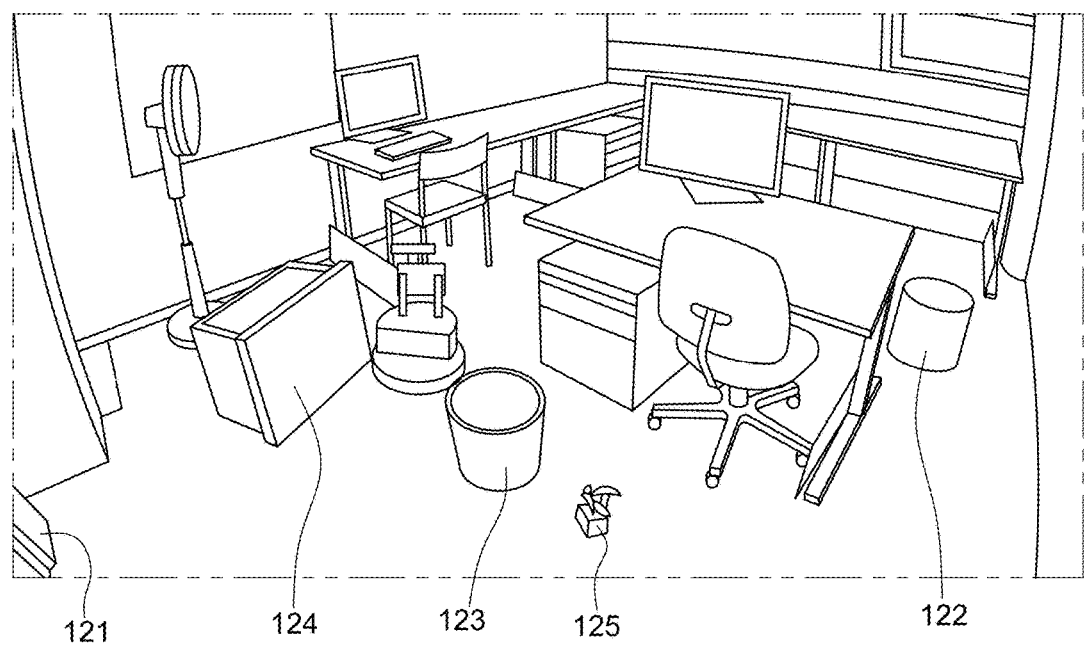
FIG. 12 is a photograph showing an office scene used for experimental mapping by a mobile robot equipped with a visuo-haptic sensor.

| Object | PC tower | Stool | Cushion | Paper bin | +content | Table | Door* | Vase | +water | Cleaner |
|---|---|---|---|---|---|---|---|---|---|---|
| Ref. Numeral in FIG. 12 | 121 | 122 | 122 | 123 | 123 | 124 | — | 125 | 125 | FIG. 8 |
| Force [N] | 15.3 | 8.1 | 19.4 | 1.5 | 6.5 | 15.9 | 2.8 | 0.6 | 0.9 | 1.3 |
| Dyn. Friction [N] | — | 7.5 | — | 1.4 | 6.1 | 15.9 | — | 0.6 | 0.9 | — |
| Deformability | 0 | 0.08 | 0.2 | 0 | 0 | 0 | — | 0 | 0 | — |
| Deceleration [s] | — | — | — | — | — | — | 0.6 | — | — | 0.7 |
| Drift | — | 3e−2 | — | 3e−2 | 3e−2 | 3e−2 | 1e−1 | 3e−1 | 1e−1 | — |
| Fixed/Fall | y/— | —/— | y/— | —/— | —/— | —/— | —/— | —/— | —/— | —/y |

Figure 13:
FIG. 13 shows a map of the scene with candidate objects for exploration and manipulation plans.

The platform was driven manually around the scene to have a Visual SLAM system acquire a map. The map obtained from an office environment is shown in FIG. 13. Haptic tags are obtained for manually or automatically selected objects (Table 1). Based on the haptic tag, the stool 122 is detected to be movable during exploration; furthermore, costs and reliability of the push can be determined. Movable objects may be integrated to a navigation graph and allow for faster task plans, which include both navigation and manipulation decisions. Manipulation push plans are depicted as lines 130 in FIG. 13.

Visual processing for the proposed sensor may run at 30 Hz camera frame rate even on larger images (1600×896 pixels) using an i7 platform. This is due to the fact that tracking relies on individual interesting points (such as the foam contour or the object region), instead of using the entire image.

Figure 14A:
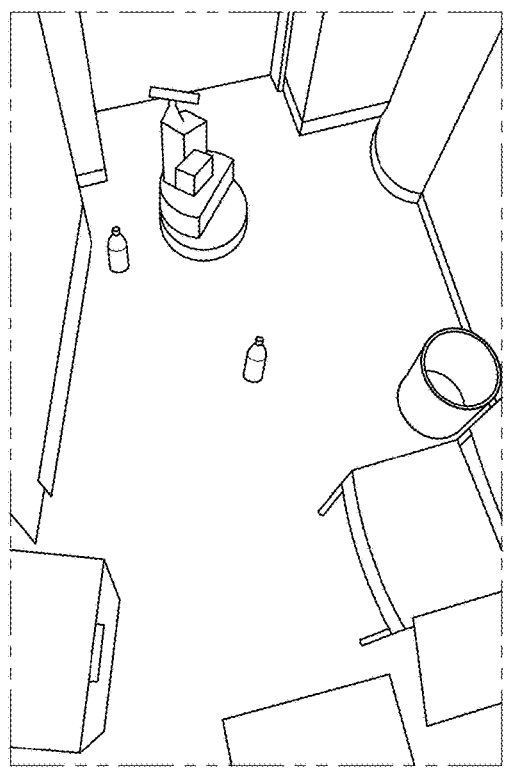
FIG. 14a is a photograph showing an office scene that was mapped by haptic exploration.
Figure 14B:
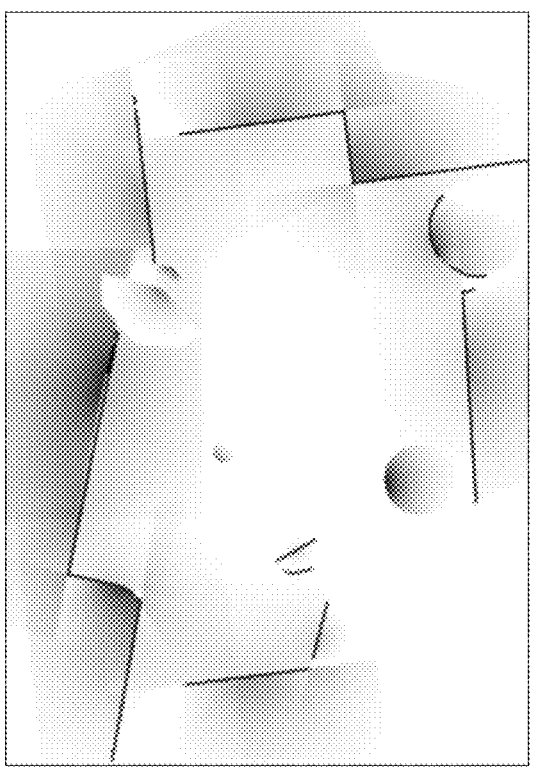
FIG. 14b is a map of the scene as in FIG. 14b derived from a visuo-haptic sensor. The map shows occupied areas, free areas, and movable objects.

Haptic tags may be used for purely haptic mapping, as shown in FIG. 14a and FIG. 14b for an office environment. Such a system may make more costly components such as a laser scanner and Visual SLAM obsolete. Location information is obtained from the robot odometry and a gyroscope. In larger workspaces, cues from a visual localization (tracking with a camera) may be added to reduce drift. A naïve exploration strategy is used, having the platform drive along the boundary of the room: Whenever an obstacle is hit, the robot is stopped, moves back, rotates counterclockwise to drive in parallel to the obstacle for a while, rotates clockwise and drives straight again. As described above, it is determined whether the obstacle is movable or not by pushing it, and its geometric primitive is stored. Next, the robot rotates, starts driving again and continues exploration.

Haptic maps are generated during exploration—one for static, one for movable objects—and updated during each contact event. The maps show the likelihood of occupancy, where 0 corresponds to free space and 1 corresponds to occupied space. At each contact event, the stored geometric primitive is added to the map as follows: The binary occupancy map nO is determined for the primitive—e.g. the area inside a circle is marked as occupied (1), and the outer parts are marked unoccupied (−1). Beyond the contact points, primitives represent just predictions of the environment, which become more inaccurate with increasing distance from the closest contact point. This is modeled as a normalized distance map $n_d \in [0,1]$, which shows the confidence of the geometric primitive.

Normalization is performed based on the extend of the contact area Like that, a primitive—such as a line—can predict a larger geometry, yet the prediction is quickly updated once a more confident measurement is available. The current observation is integrated into the global map m as follows:

$$m' = (1 - c\mathcal{T}(n_d)) \cdot m + c\mathcal{T}(nOn_d), \quad (5)$$

$$n_d(x, y) = \exp\left(-\frac{1}{D}\min_k \left\| (x, y, 0) - P_k^F \right\| \right)$$

The factor c determines how quickly old measurements are replaced and is set to 0.5 here. Transformation T aligns the new observation with the map frame, using the current pose of the platform. The distance map $n_d$ is calculated from the distance to the closet contact point $P_k$, normalized by the diameter D of the contact area.

Results are shown for a small office space in FIG. 14a and FIG. 14b which was explored using 22 contact events. The structure of the room with the walls, column and door is accurately represented, even though some shapes extend beyond the room. One of the reachable chair legs appears as a small blob left of the paper bin. The discovered movable objects (paper bin near the right wall, two bottles) are depicted in blue. The bottle next to the platform was explored twice and moved in between by the platform. In this case, a corner primitive rather than a circle is fit, since the object is quite small. Note that visual mapping systems would easily overlook this bottle, since it is completely transparent, apart from the cap.

An abstract graph representation may be used which jointly models navigation and manipulation decisions. First, high-level navigation nodes are generated from a visually obtained occupancy grid map. Next, an approach is presented to complement this visual navigation graph with manipulation nodes. These nodes represent obstacles which can be moved to open new paths. On the presented system, manipulation is limited to pushing objects away. Haptic tags may be used to estimate manipulation parameters. A path in the extended visuo-haptic graph translates to both navigation and manipulation tasks, depending on the node types along it.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A tactile sensor, comprising:
   a camera configured to capture images;
   an elastically deformable element having a front surface, a top surface, and a back surface, the top surface being arranged within view of the camera and the back surface being attached to a mounting structure; and
   an image processor operatively connected to the camera and configured to detect elastic deformation of the elastically deformable element in the captured images and to determine a pressure and/or a force acting on the elastically deformable element based on the detected elastic deformation.

2. The tactile sensor as in claim 1,
wherein a contour of the top surface of the elastically deformable element changes between an uncompressed state when no force is applied to the front surface and a compressed state when a force is applied to the front surface which compresses the deformable element between the front surface and the back surface, and
wherein the image processor tracks the contour of the top surface of the elastically deformable element in the captured images of the camera and evaluates a relative displacement of the contour of the top surface between the compressed state and the uncompressed state.

3. The tactile sensor as in claim 2,
wherein the image processor converts relative displacement of the contour of the top surface from image coordinates to world coordinates.

4. The tactile sensor as in claim 3,
wherein the image processor uses intrinsic camera parameters in deriving world coordinates from image coordinates.

5. The tactile sensor as in claim 2,
further comprising a data processor which determines forces and/or pressure acting on the deformable element based on a compression model of the deformable element and the relative displacement of the contours from the uncompressed state to the compressed state.

6. The tactile sensor as in claim 2,
further comprising a data processor which determines a profile of forces and/or pressure acting along the deformable element based on a compression model of the deformable element and the relative displacement of the contours from the uncompressed state to the compressed state.

7. The tactile sensor as in claim 1, wherein the deformable element comprises plastic foam or rubber foam.

8. The tactile sensor as in claim 1,
wherein the camera has a field of view which is selected such that objects applying a force to the front surface of the elastically deformable element are at least partially visible in the captured images, and
wherein the image processor performs recognition and/or a pose estimation of the objects in the captured images.

9. The tactile sensor as in claim 1, wherein the mounting structure is a finger of a robotic gripper and wherein the robotic gripper is controlled in response to the pressure and/or the force determined in the image processor.

10. The tactile sensor as in claim 1, wherein the mounting structure is a base or a body of a mobile robot and wherein movement of the mobile robot controlled in response to the force and/or the pressure determined in the image processor.

11. The tactile sensor from claim 1, wherein the camera is rigidly connected to the mounting structure and wherein the image processor uses a constant geometric transformation in deriving world coordinates from image coordinates.

12. The tactile sensor as in claim 1, wherein two or more elastically deformable elements are in view of the camera and wherein the image processor determines the pressure and/or the force acting on each of the two or more elastically deformable elements.

13. The tactile sensor as in claim 1, wherein two or more elastically deformable elements are in view of two or more cameras that are operatively connected to the image processor and wherein the image processor determines the pressure and/or the force acting on each of the two or more deformable elements by evaluating captured images from at least one of the two or more cameras.

14. A method for tactile sensing, comprising:
providing an elastically deformable element on a rigid surface;
providing a camera positioned such that a top surface of the elastically deformable element is in view of the camera;
capturing images from the camera; and
evaluating the captured images to detect elastic deformation of the elastically deformable element in the captured images to calculate a haptic tag.

15. The method as in claim 14, wherein the haptic tag comprises at least one characteristic of an object that is in contact with the deformable element, the characteristic being selected from the group consisting of a friction force, a deformation, and a shape.

16. The method as in claim 14,
wherein the rigid surface is a finger of a two-finger gripper, and
wherein the elastically deformable element is a cuboid piece of plastic foam having a back surface mounted to the finger of the two-finger gripper and an opposite front surface facing the opposite finger, and
wherein evaluating the captured images comprises
detecting and tracking a contour of the top surface of the plastic foam in the captured images and
determining a relative displacement of the contour compared to an uncompressed state in which no force acts on the finger.

17. The method as in claim 16, wherein evaluating the captured images further comprises converting the relative displacements from image coordinates to relative displacements in world coordinates based on intrinsic parameters of the camera and based on a geometric transformation between the camera and the back surface of the plastic foam.

18. The method as in claim 16, wherein calculating the force acting on a front surface of the elastically deformable element is based on a compression model of the plastic foam and on a distance between the front surface and the back surface of the plastic foam as determined by comparing a contour line associated with the front surface and a contour line associated with the back surface of the plastic foam.

19. A method for controlling a robot, comprising:
providing an elastically deformable element on a rigid surface of a robot;
providing a camera positioned such that a top surface of the elastically deformable element is in view of the camera;
capturing images from the camera;
evaluating the captured images to detect elastic deformation of the elastically deformable element in the captured images to calculate a force acting on a front surface of the elastically deformable element; and
controlling movement of the robot in response to the calculated force.

20. The method as in claim 19, further comprising performing recognition and/or pose estimation of objects visible in the captured images.

* * * * *